Jan. 5, 1954 R. I. HAHN ET AL 2,664,619
TUBE FLARING AND NUT ASSEMBLING MACHINE
Filed April 23, 1947 20 Sheets-Sheet 1

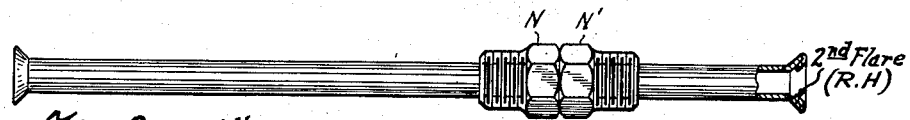

Fig. 8    6th OPERATION    STATION 8

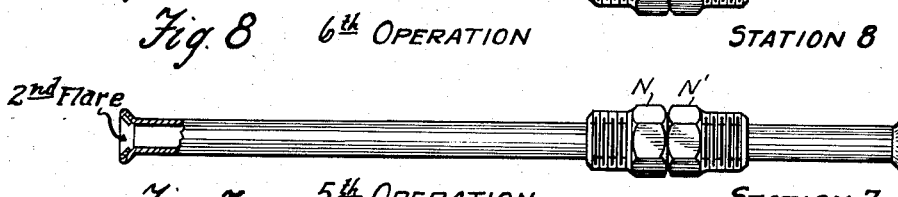

Fig. 7    5th OPERATION    STATION 7

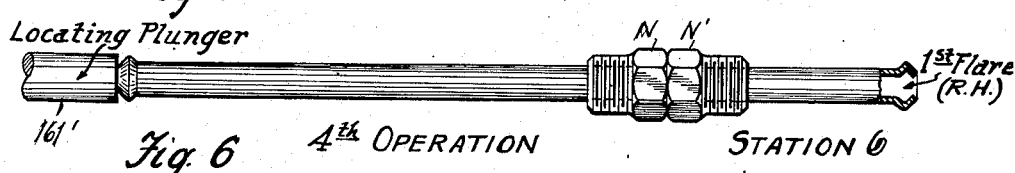

Fig. 6    4th OPERATION    STATION 6

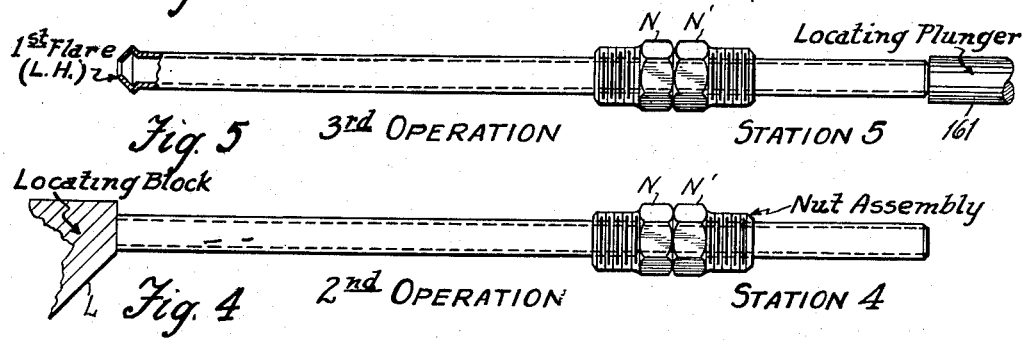

Fig. 5    3rd OPERATION    STATION 5

Fig. 4    2nd OPERATION    STATION 4

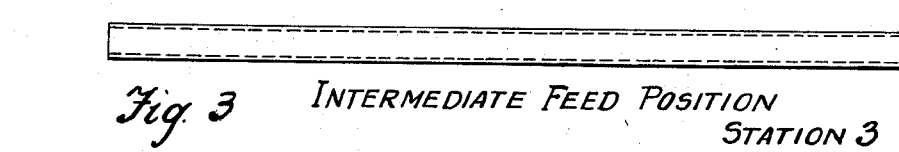

Fig. 3    INTERMEDIATE FEED POSITION    STATION 3

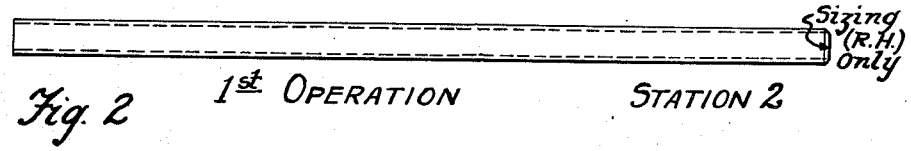

Fig. 2    1st OPERATION    STATION 2

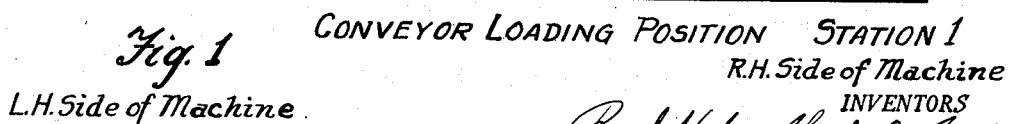

Fig. 1    CONVEYOR LOADING POSITION    STATION 1

L.H. Side of Machine      R.H. Side of Machine

INVENTORS
Rea J. Hahn & Charles M. Franklin
BY
Spencer Hardman & Fehr
their attorneys

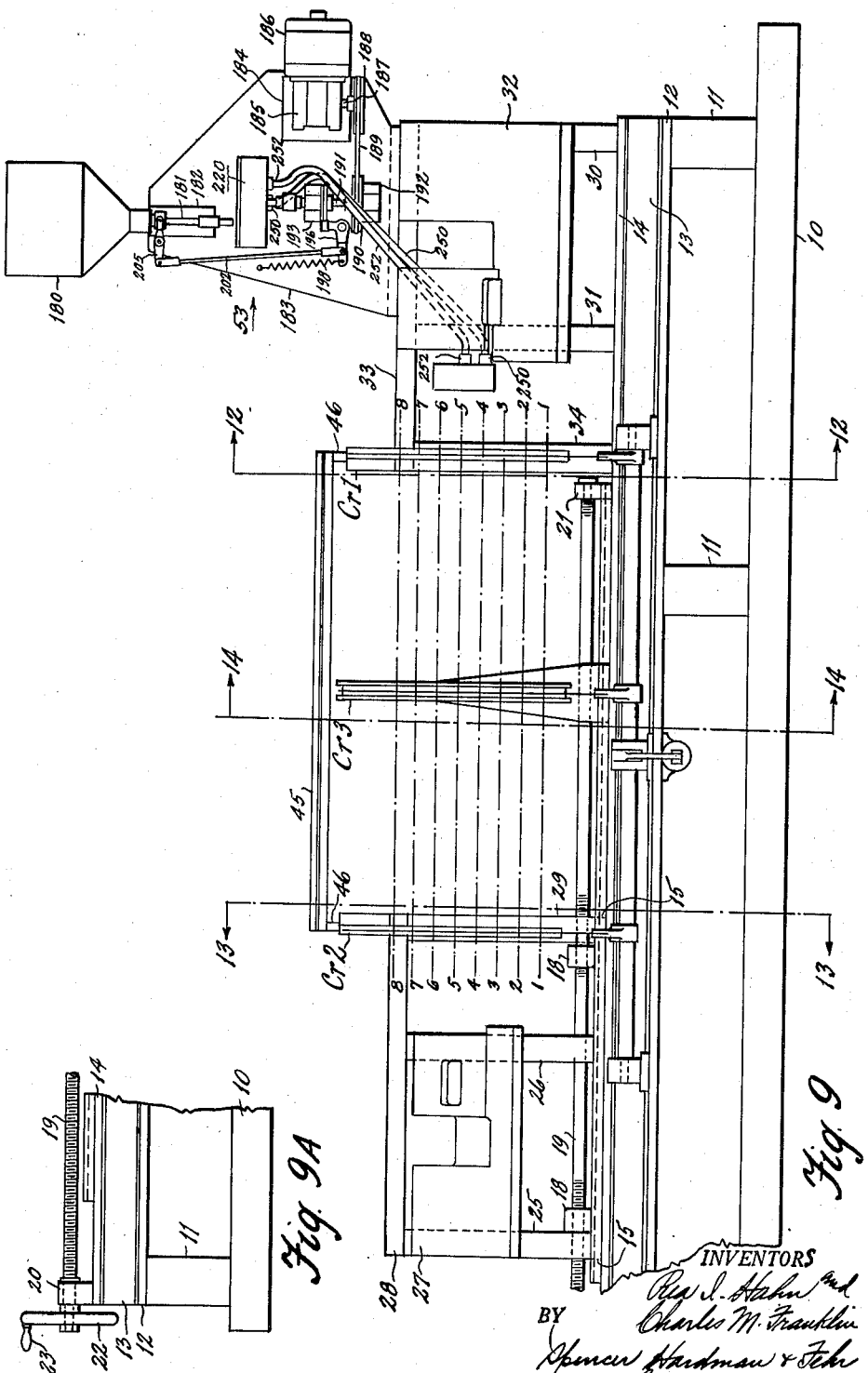

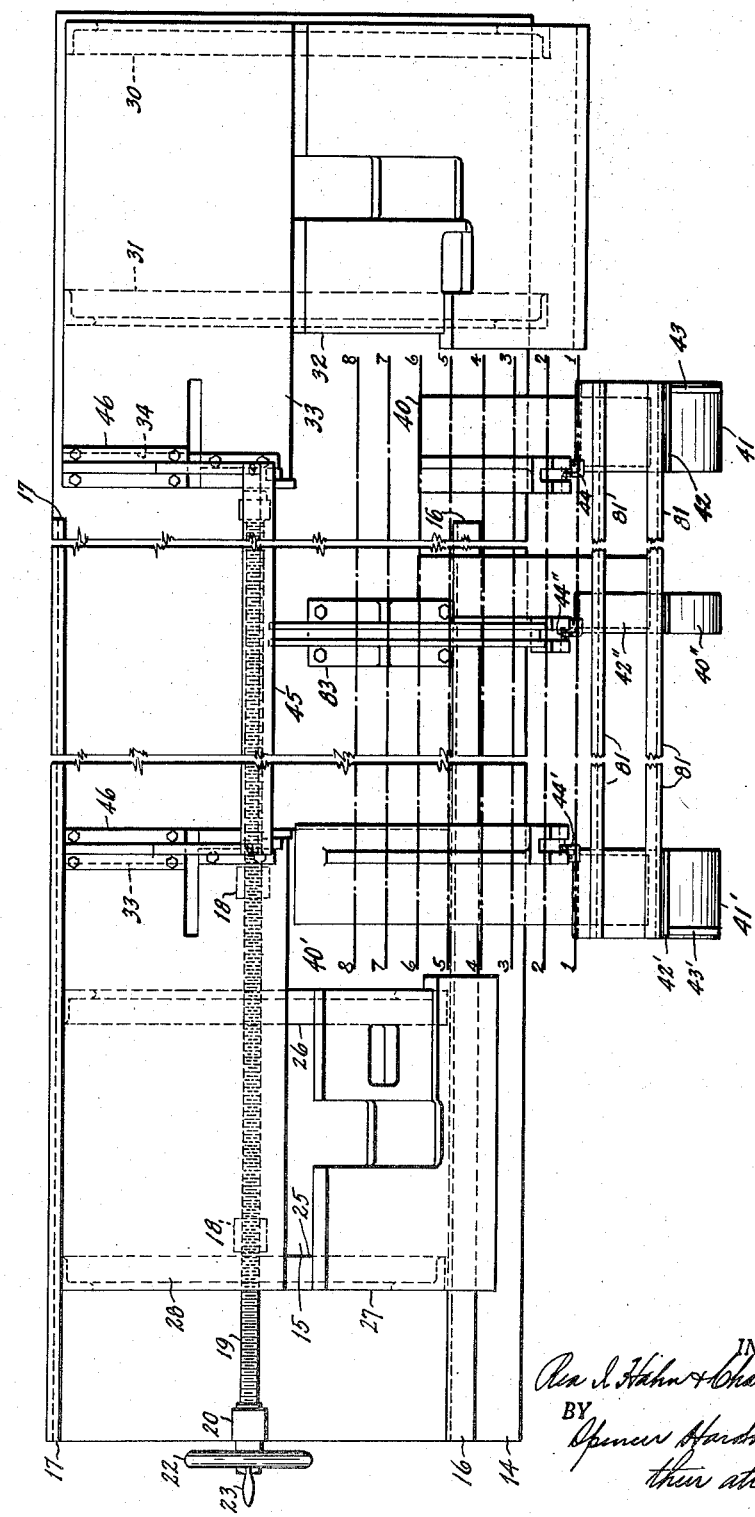

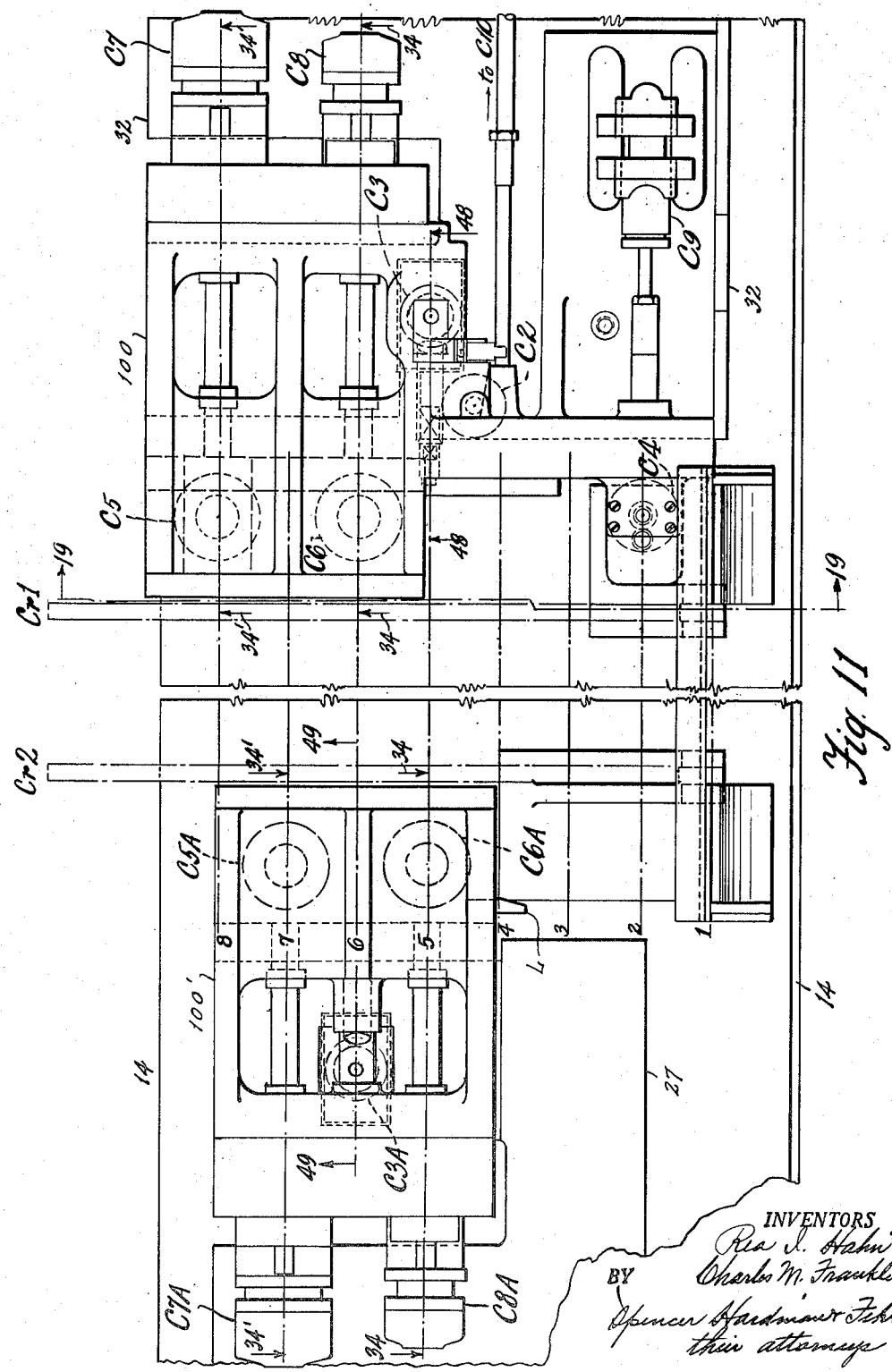

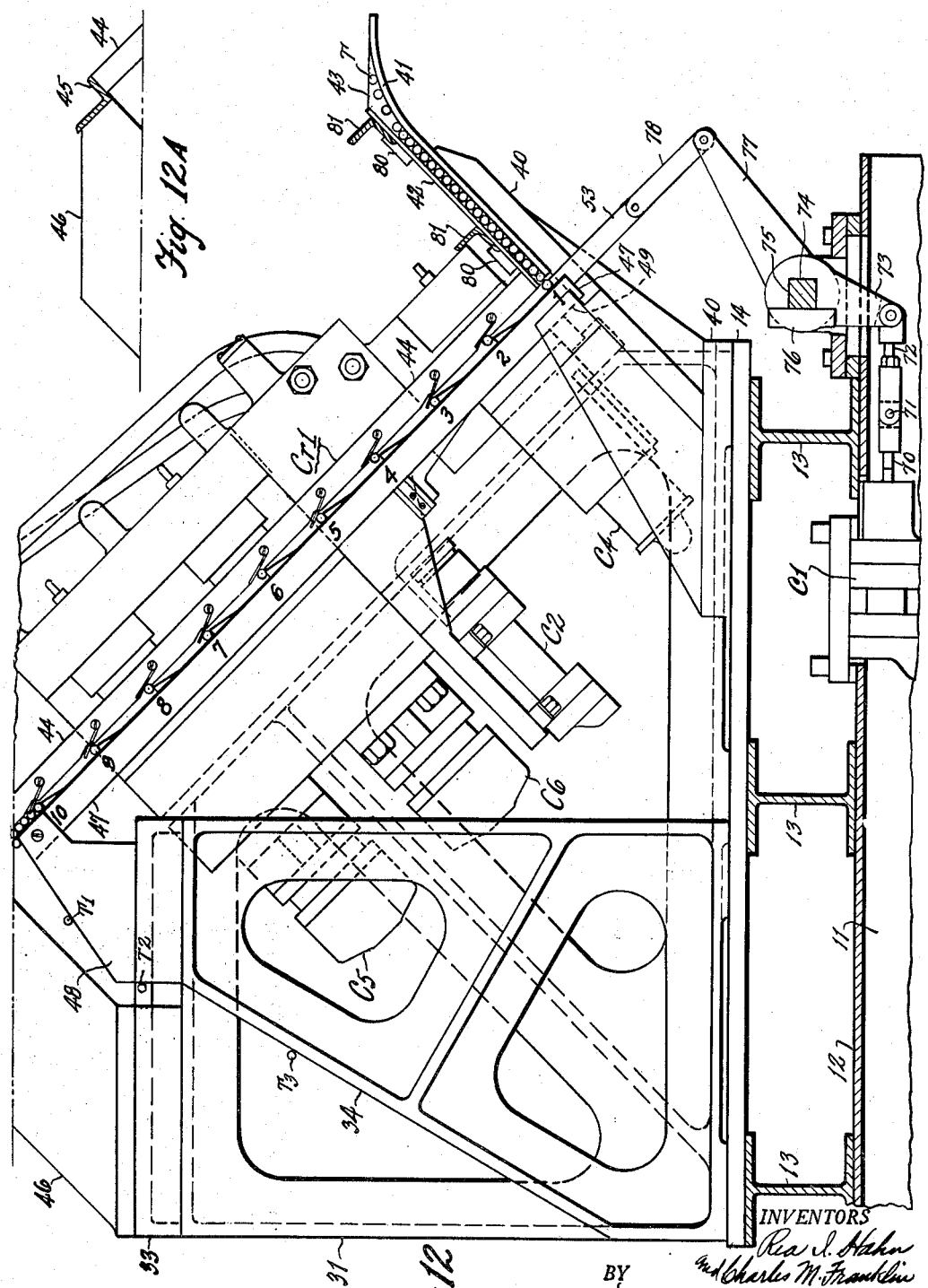

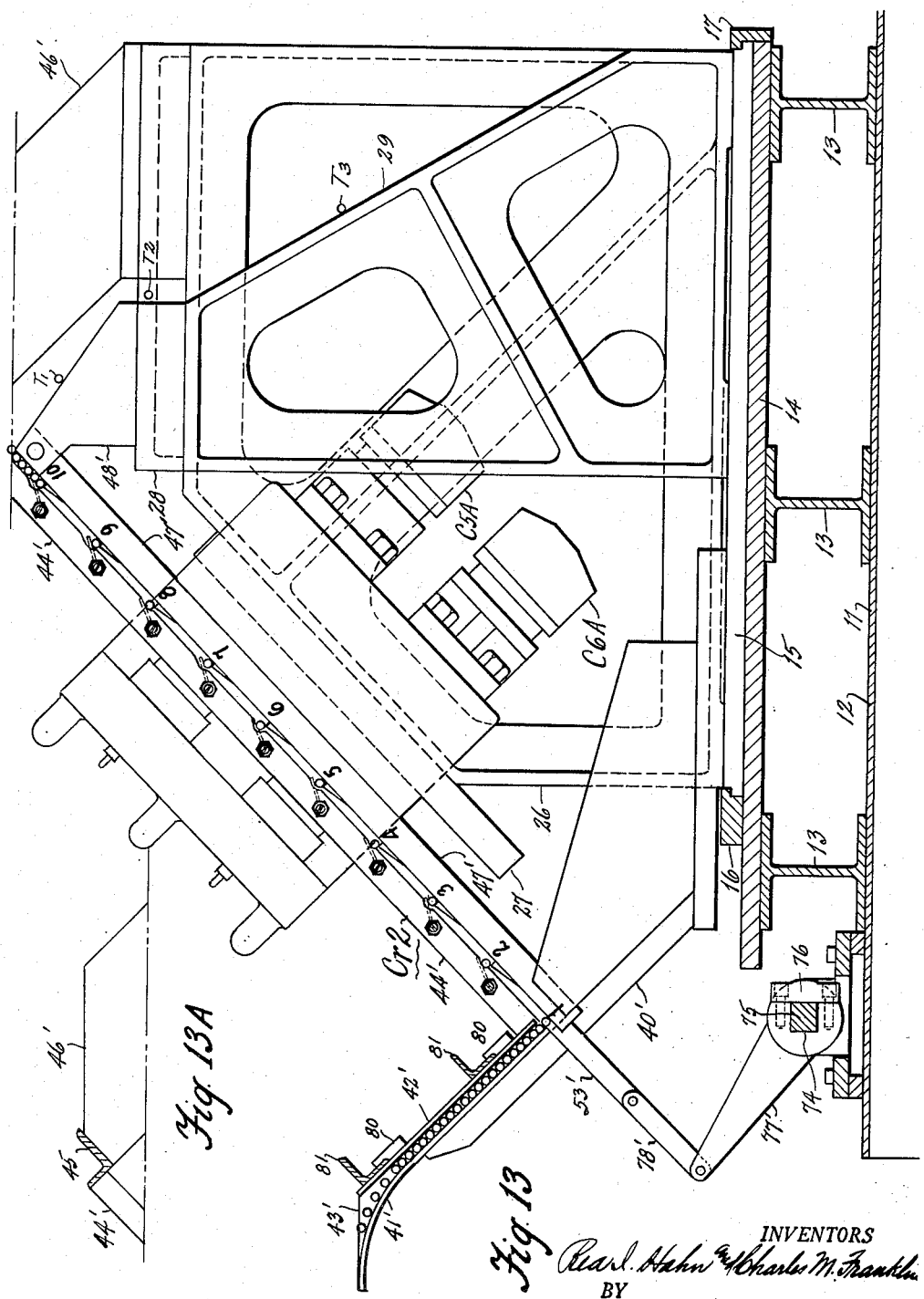

Jan. 5, 1954 R. I. HAHN ET AL 2,664,619
TUBE FLARING AND NUT ASSEMBLING MACHINE
Filed April 23, 1947 20 Sheets-Sheet 7
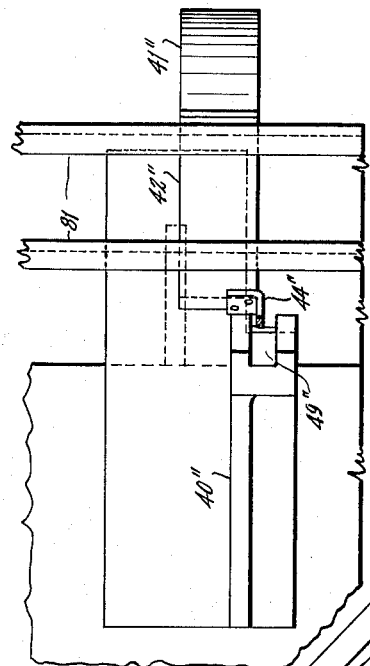
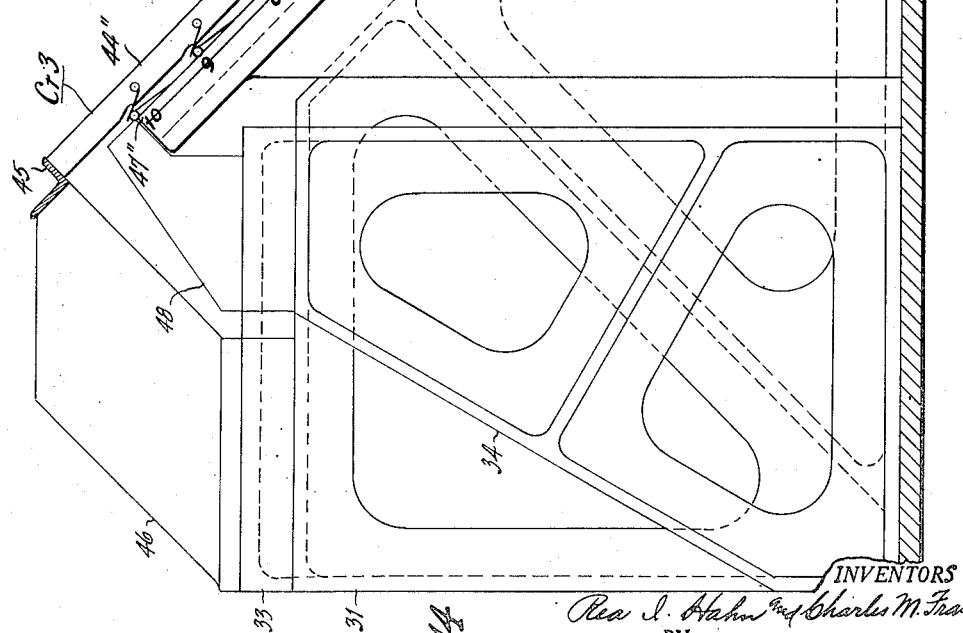

Jan. 5, 1954   R. I. HAHN ET AL   2,664,619
TUBE FLARING AND NUT ASSEMBLING MACHINE
Filed April 23, 1947   20 Sheets-Sheet 8
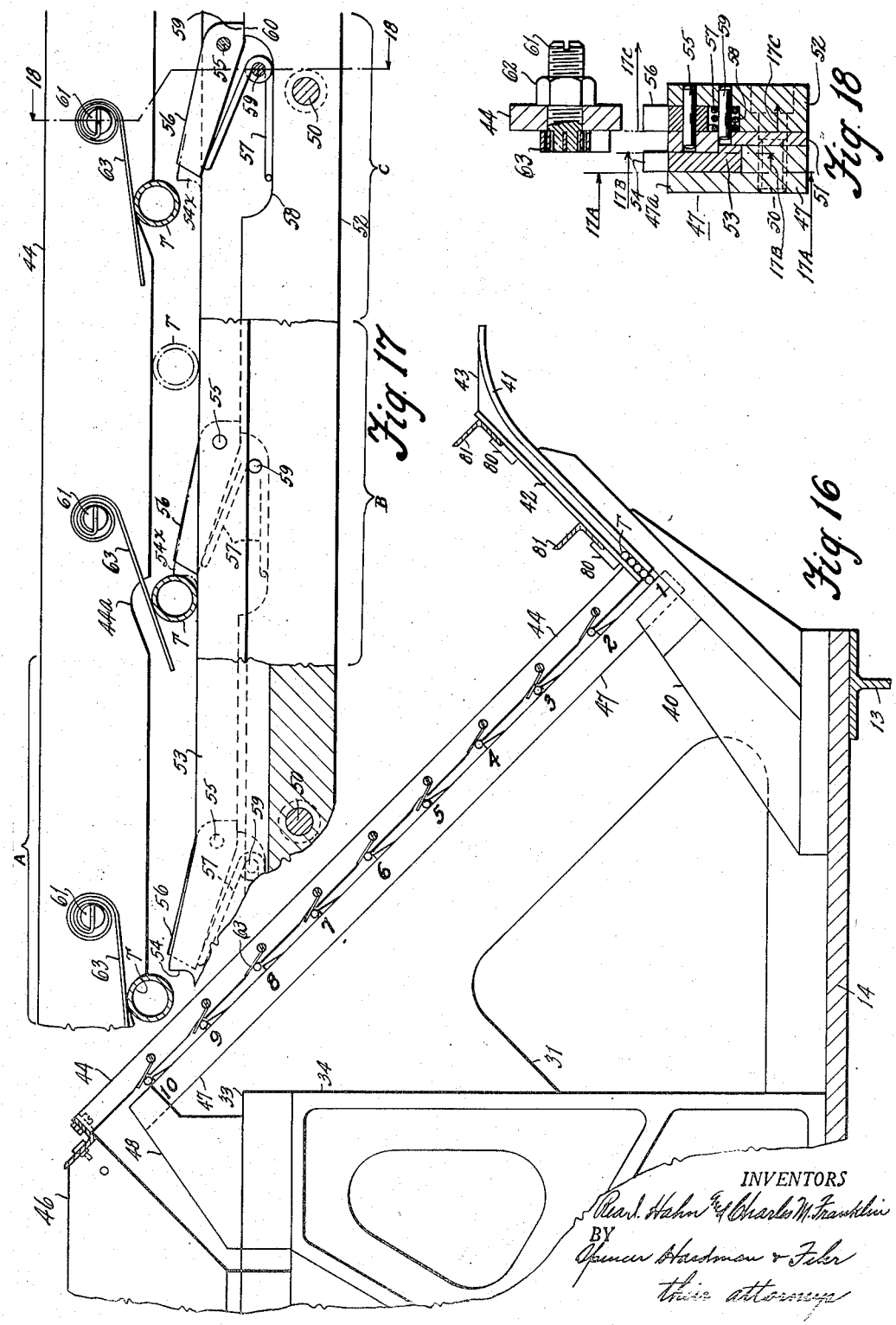
INVENTORS
Pearl I. Hahn, Jr. & Charles M. Franklin
BY
Spencer Horsman & Filer
their attorneys

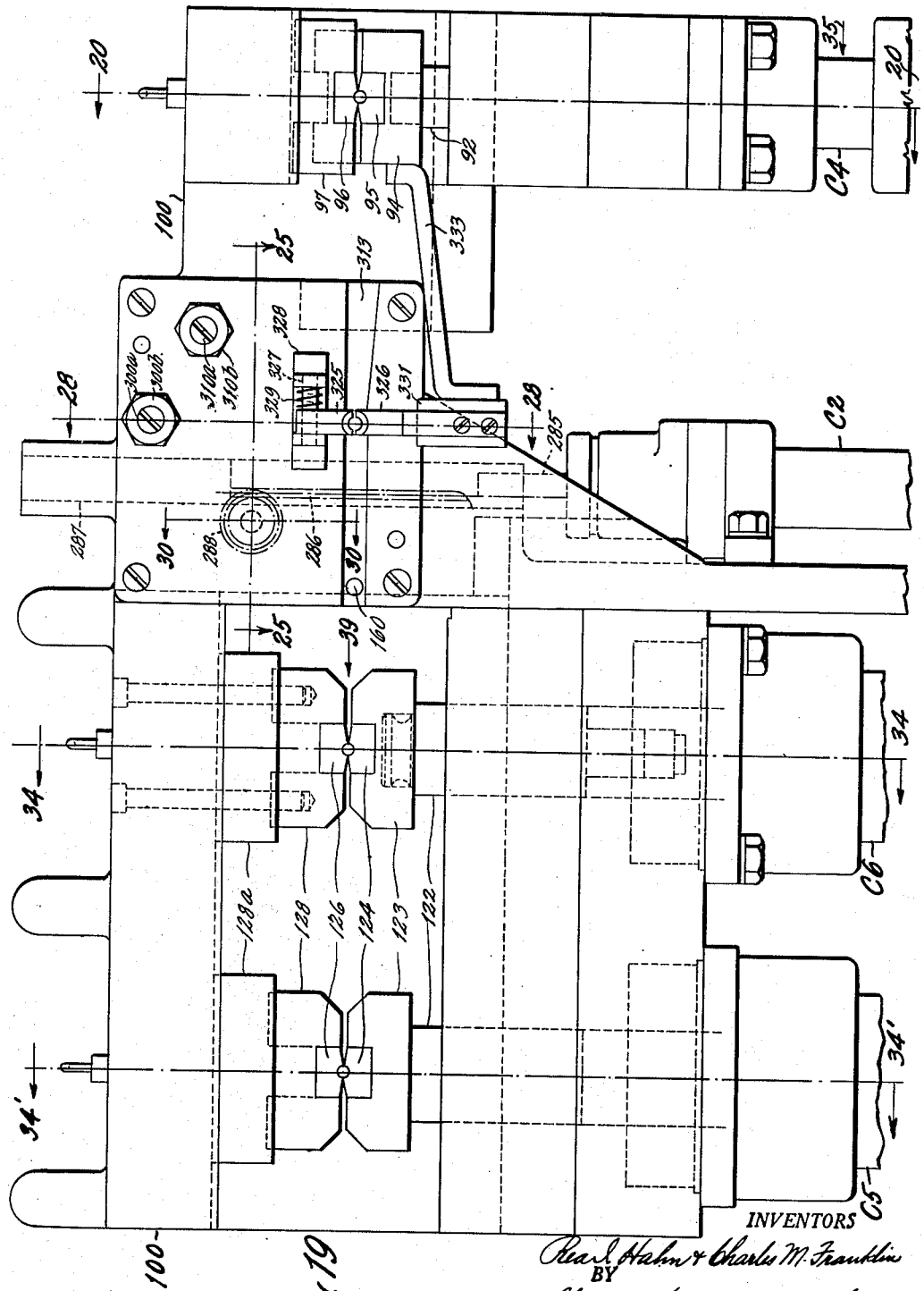

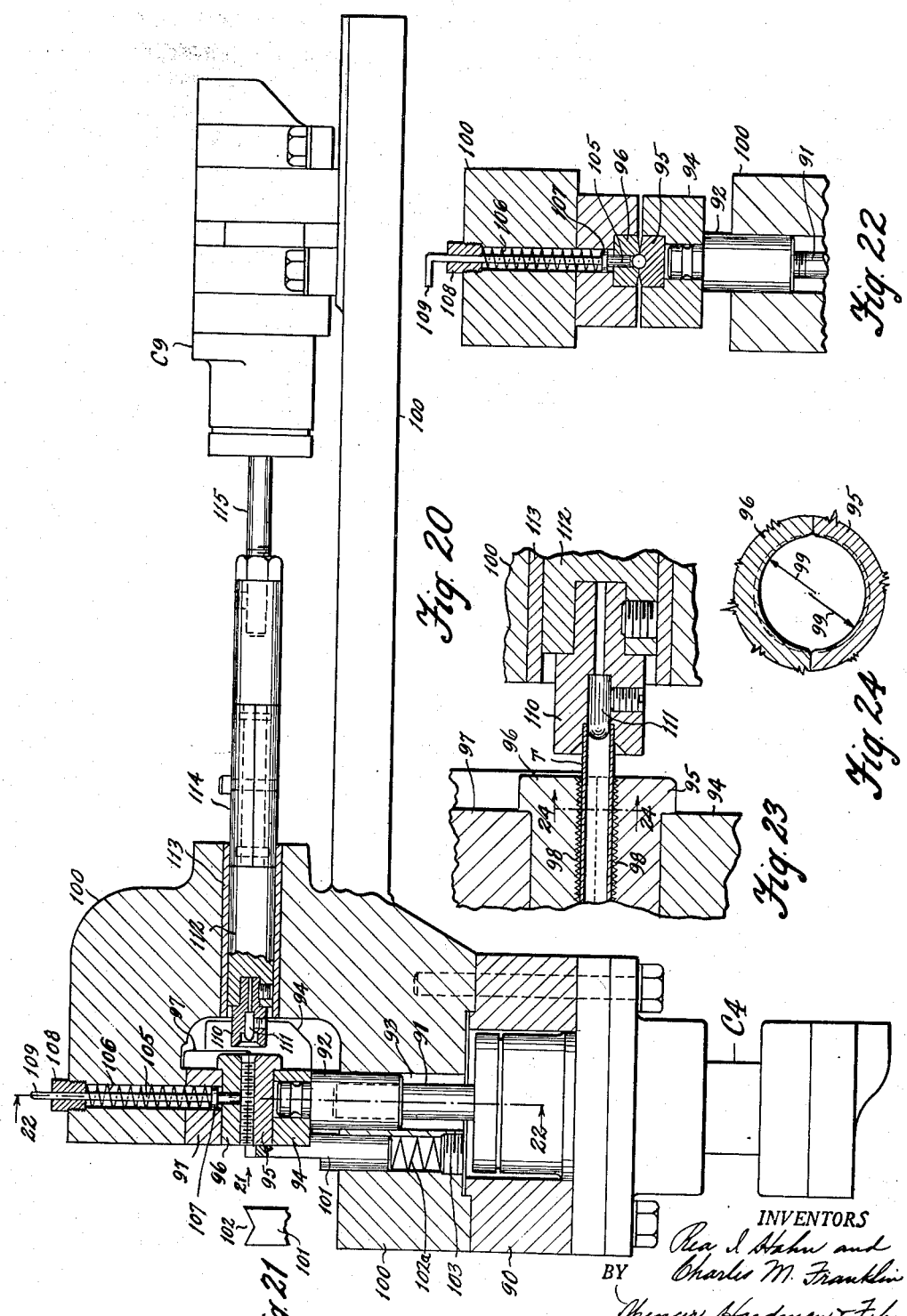

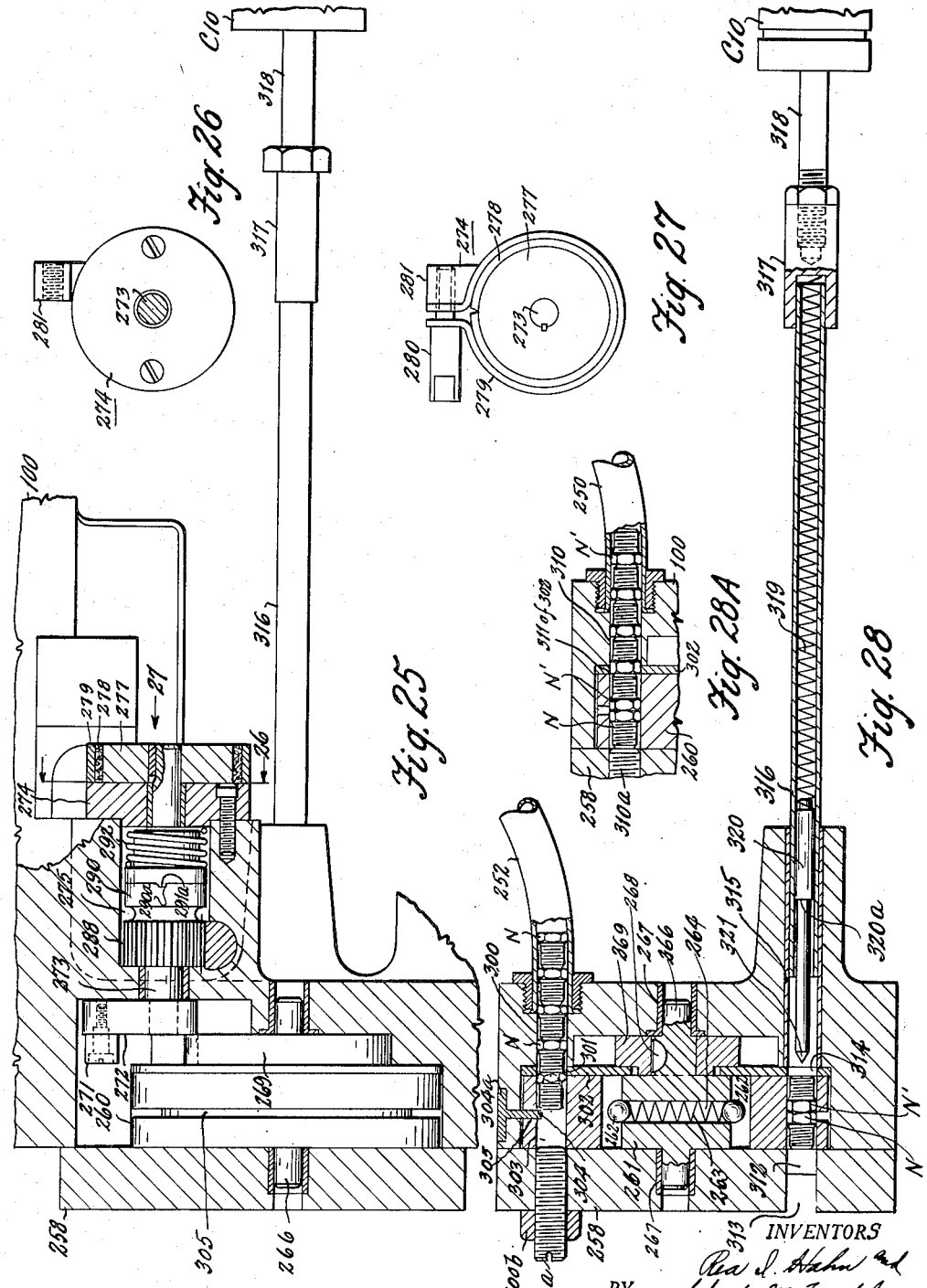

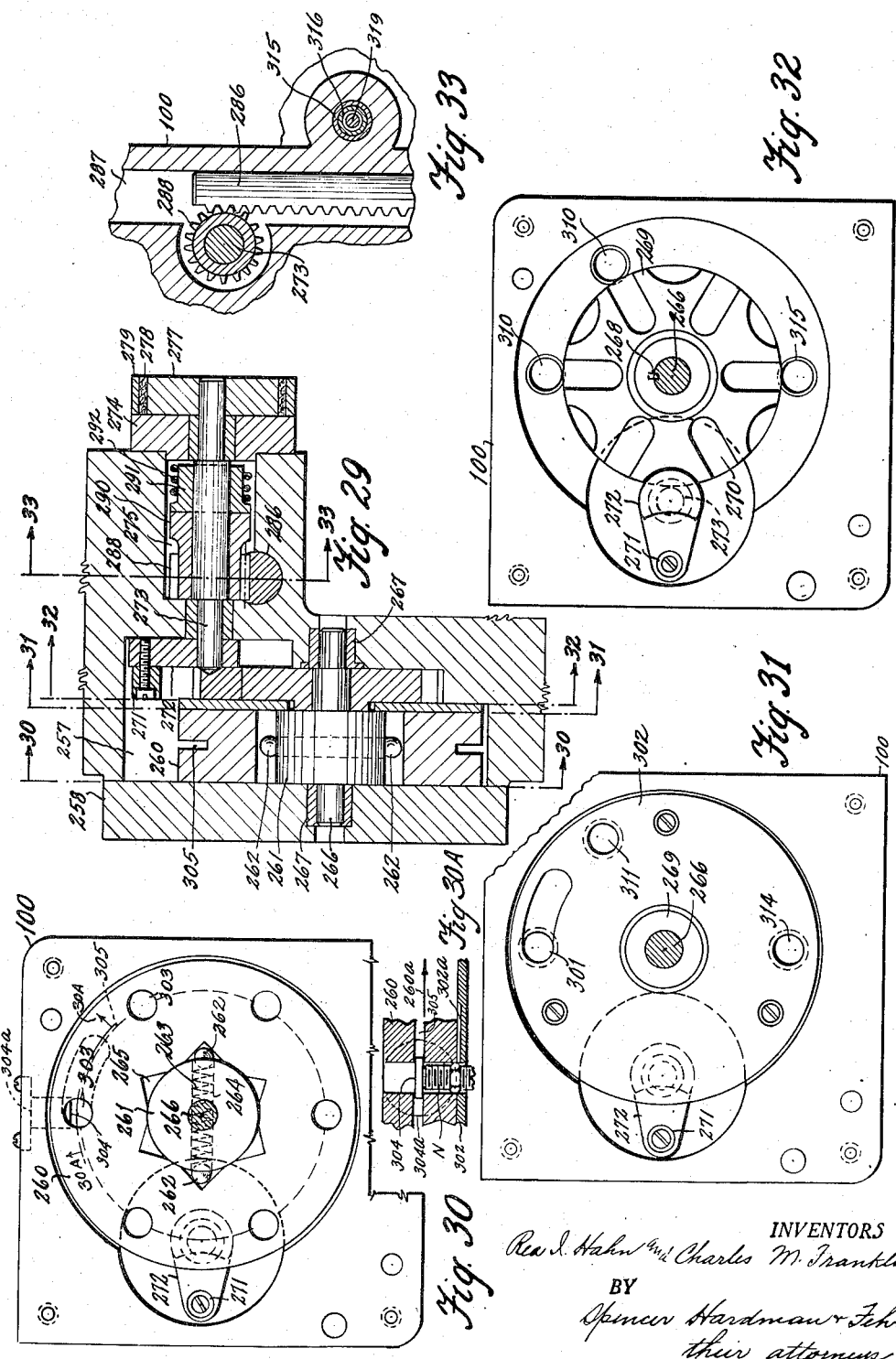

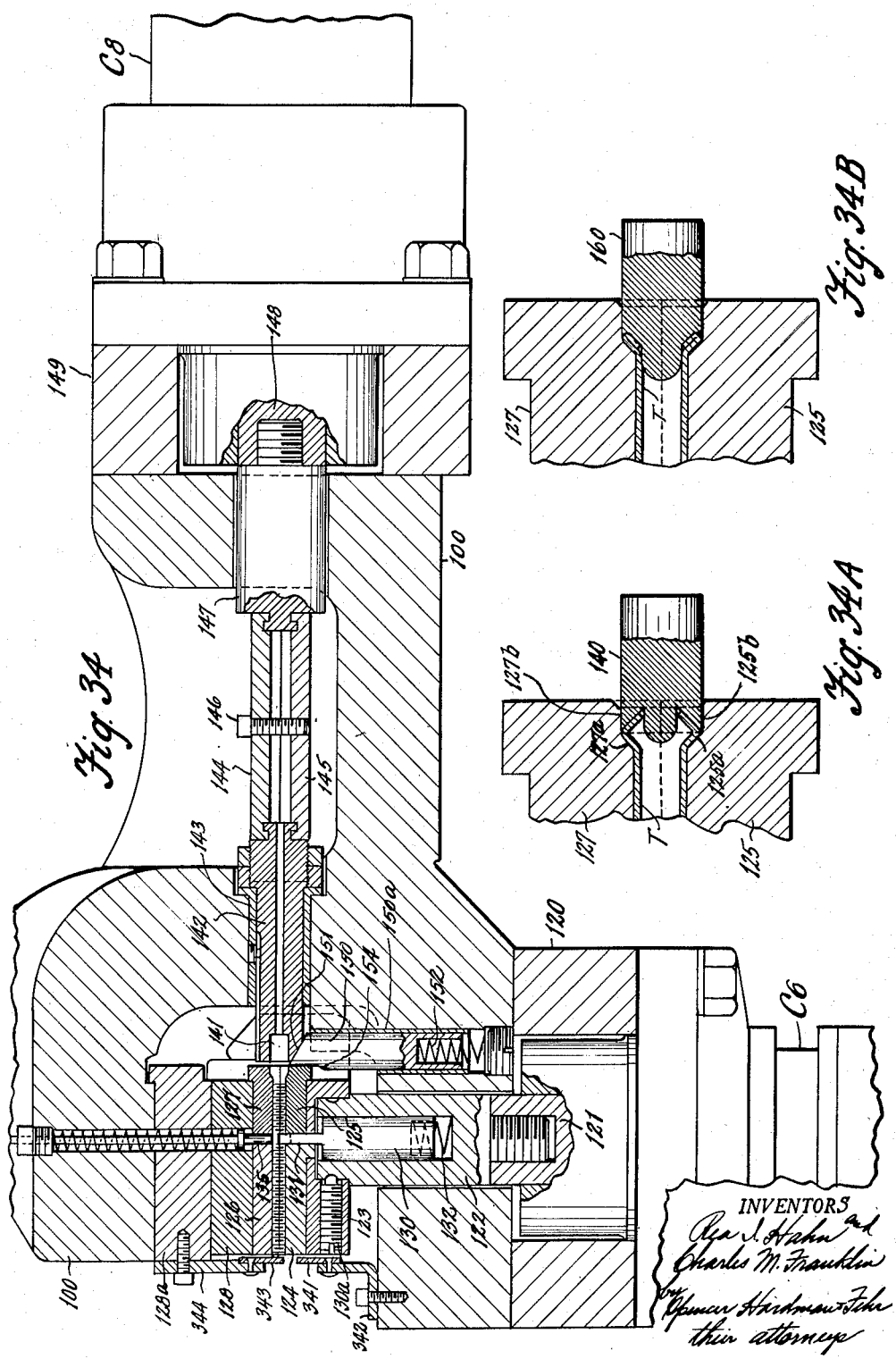

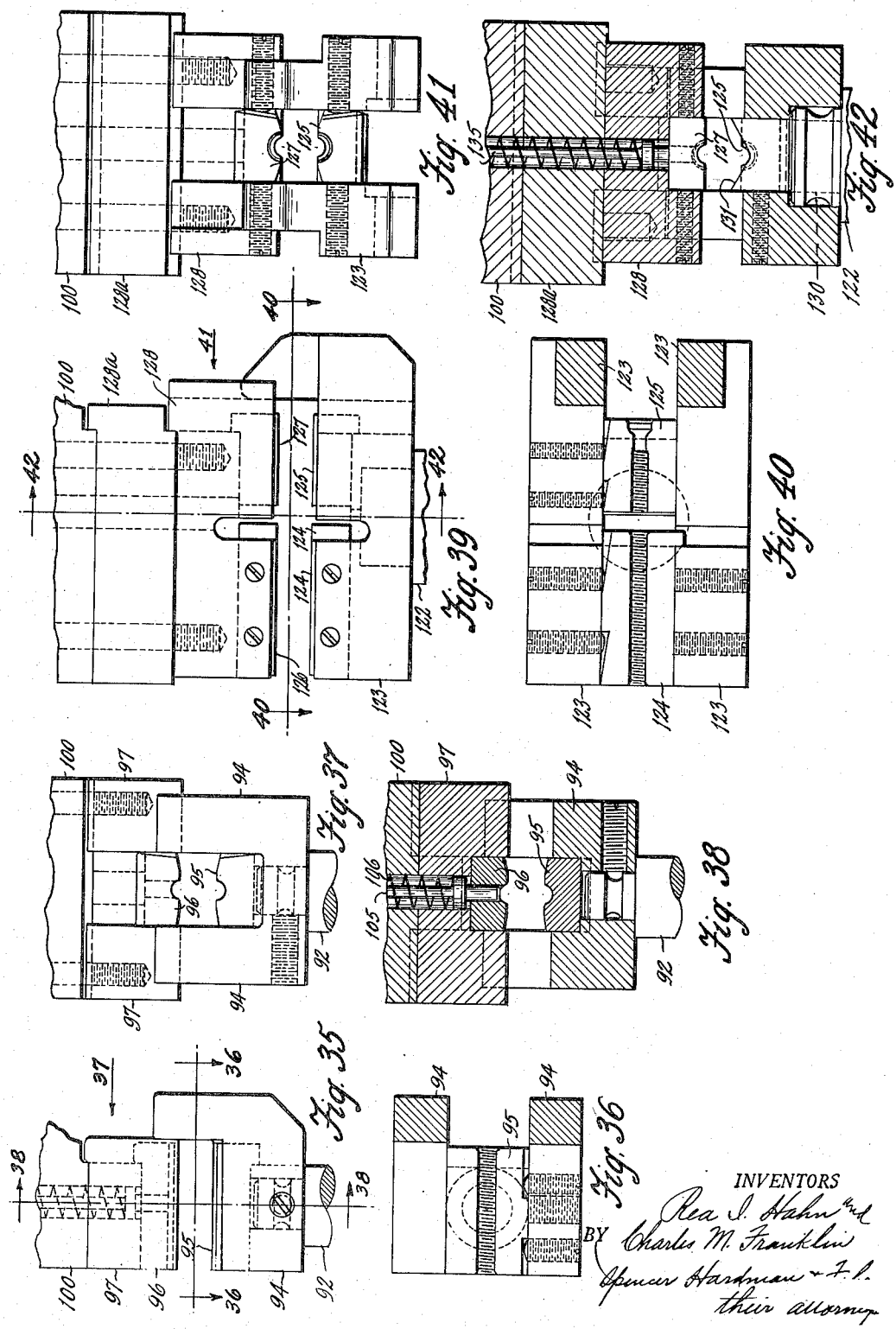

Jan. 5, 1954   R. I. HAHN ET AL   2,664,619
TUBE FLARING AND NUT ASSEMBLING MACHINE
Filed April 23, 1947   20 Sheets-Sheet 15
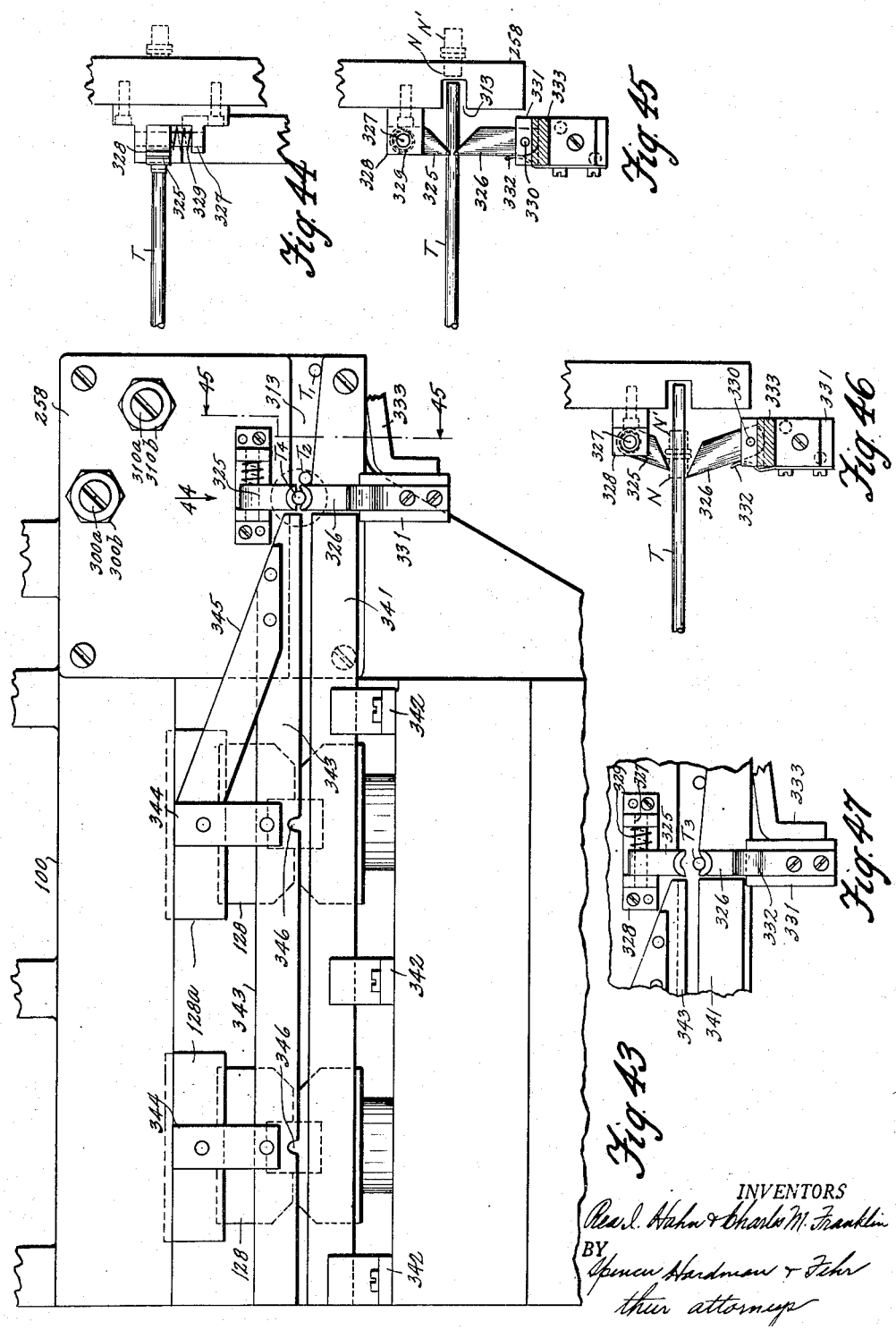

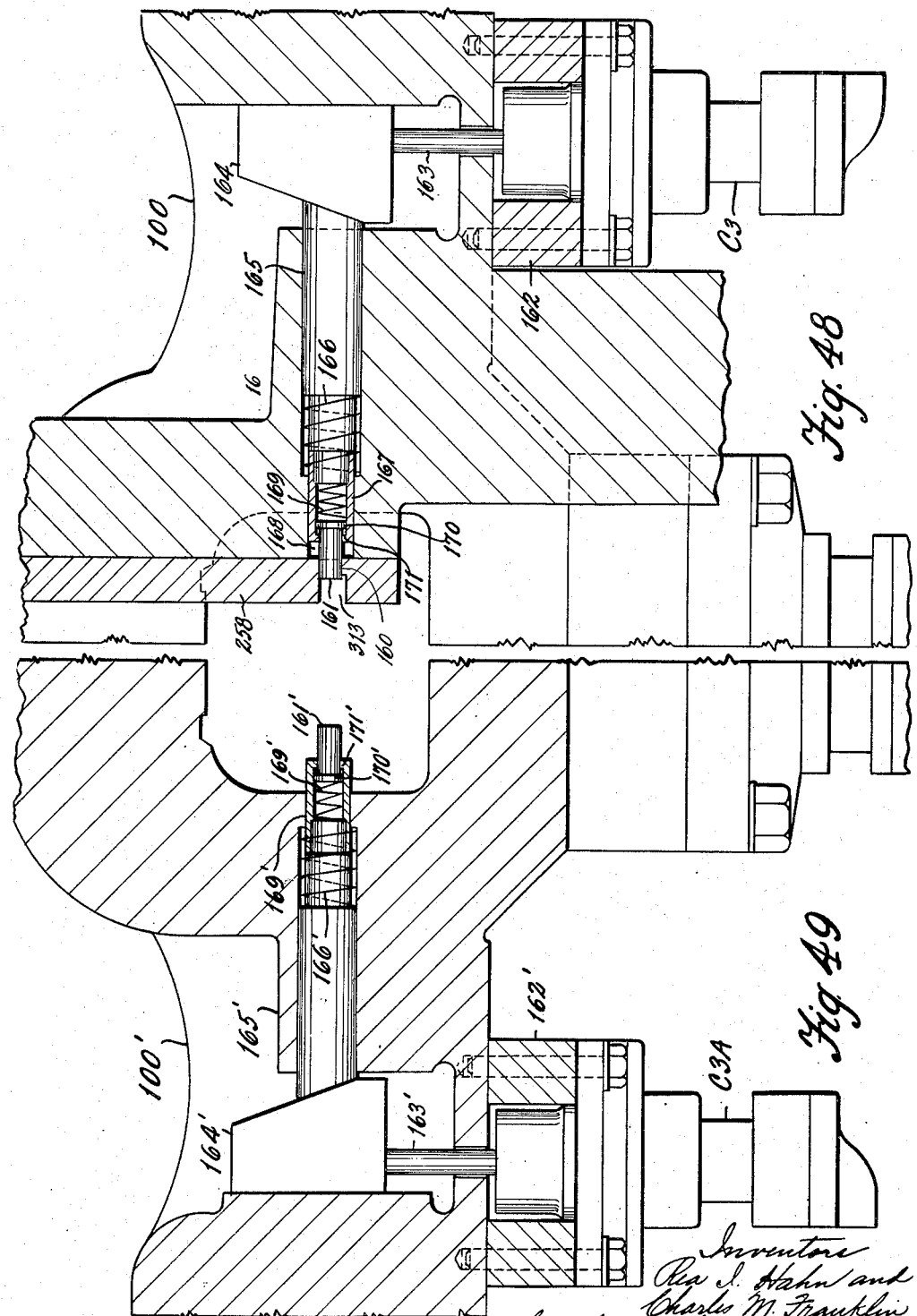

Jan. 5, 1954 R. I. HAHN ET AL 2,664,619
TUBE FLARING AND NUT ASSEMBLING MACHINE
Filed April 23, 1947 20 Sheets-Sheet 17

INVENTORS
Rea I. Hahn and
Charles M. Franklin
by Spencer Hardman & Fehr
their attorneys

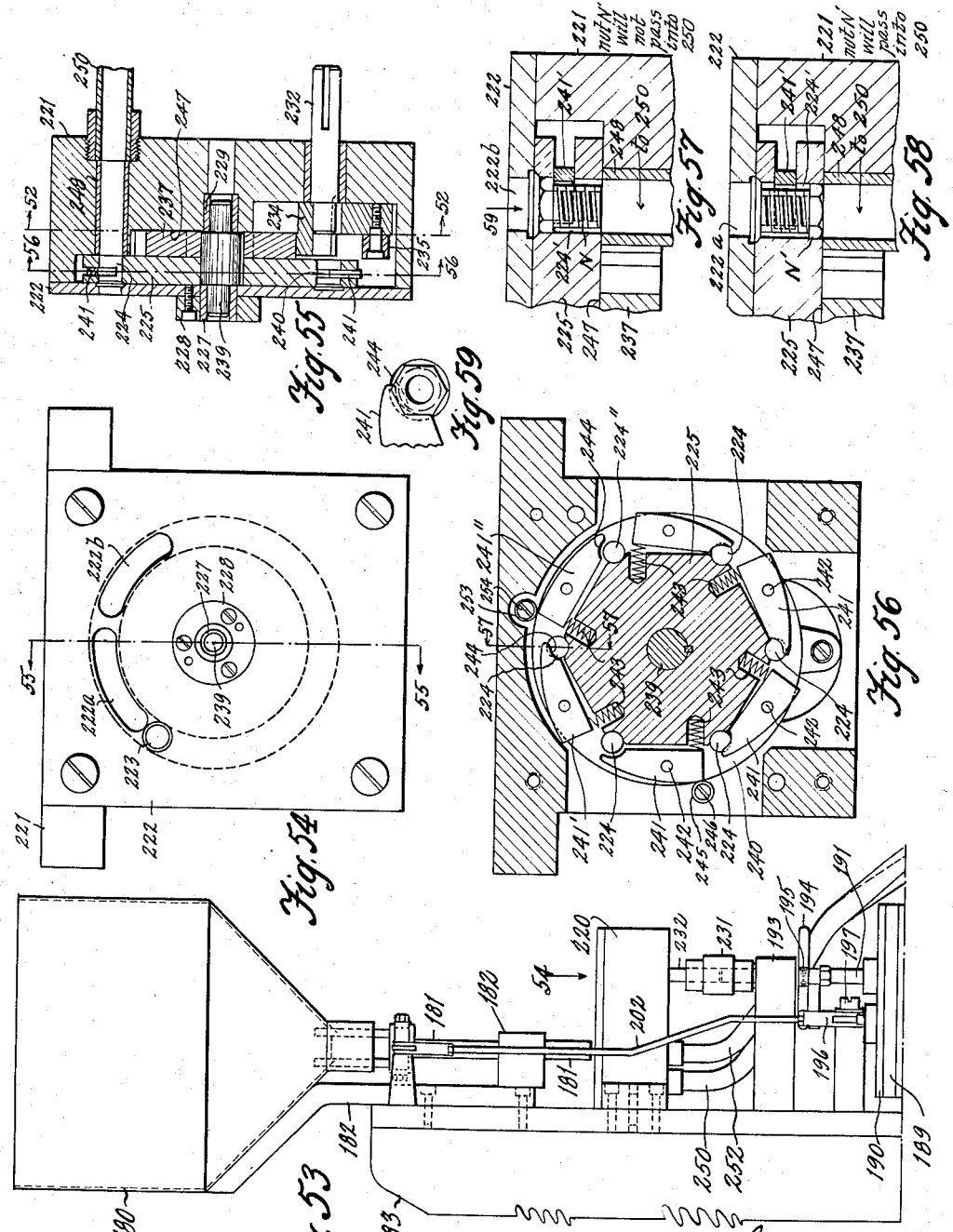

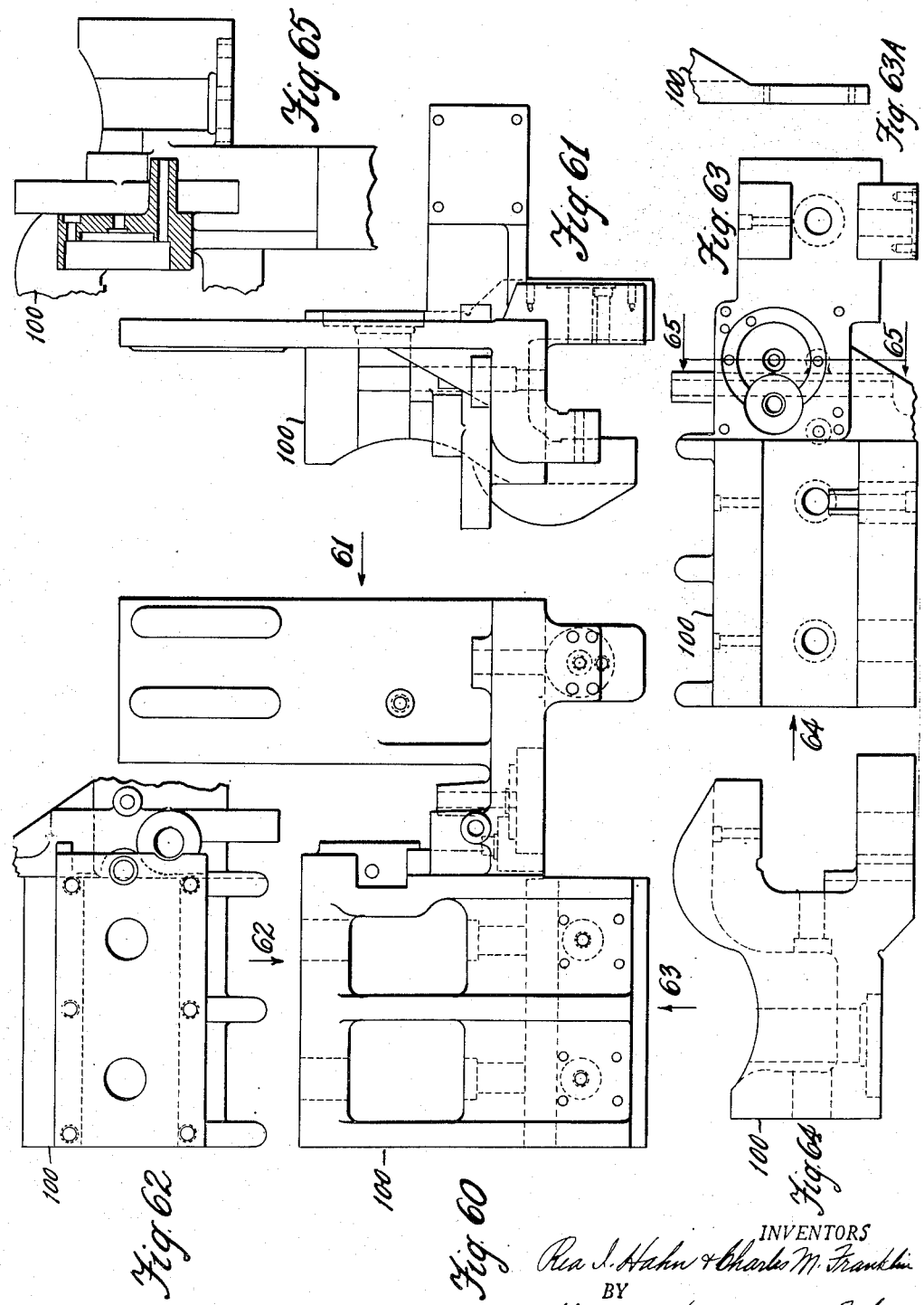

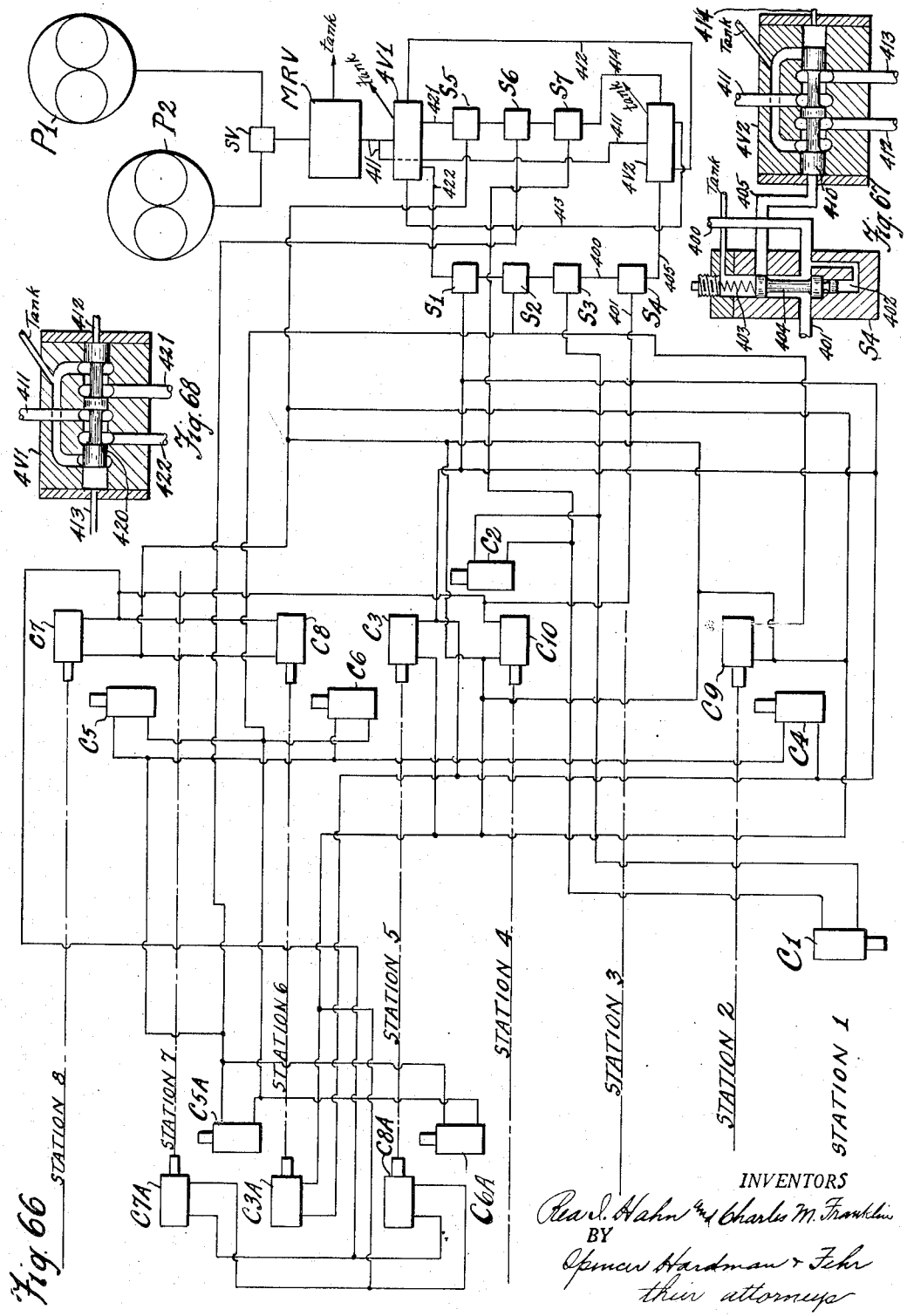

Patented Jan. 5, 1954

2,664,619

UNITED STATES PATENT OFFICE 2,664,619

TUBE FLARING AND NUT ASSEMBLING MACHINE

Rea I. Hahn and Charles M. Franklin, Rochester, N. Y., assignors to General Motors Corporation, Detroit, Mich., a corporation of Delaware Application April 23, 1947, Serial No. 743,334

6 Claims. (Cl. 29—241)

This invention relates to the processing of tubing for installation in a fluid circuit such as the oil line or gasoline line of an automotive vehicle.

An object of the invention is to provide a machine which will automatically assemble coupling nuts upon the tubing and flare the ends of the tubing for seating engagement with other coupling members which are threadedly engaged by the coupling nuts. In the disclosed embodiment of the invention, this object is accomplished by the combination of means for moving lengths of tubing from a magazine successively to a station where one end of the tube is sized to facilitate the pushing of nuts thereon at another station. At stations further along in the movement of the tubing, the ends thereof are flared. The nuts are stored in a hopper from which they descend either threaded portion downward or uppermost. A sorting device separates the nuts which descend threads-down from those which descend threads-up and causes them to descend respectively through separate pipes to a device which pairs them, each pair comprising a nut which is to advance threads foremost upon the tube at the nut assembling station and a nut which is to advance threads rearmost. A device at the nut assembling station pushes the pair of nuts, thus arranged, upon the tube.

A further object is to provide a machine of the character described which can be readily adjusted to take various lengths of tubing.

A further object is to provide a system of hydraulic control by which the various operations are performed in recurrent sequence by fluid pressure operated devices.

Further objects and advantages of the present invention will be apparent from the following description, reference being had to the accompanying drawings, wherein a preferred embodiment of the present invention is clearly shown.

In the drawings:

Figs. 1 to 8 are views of the tubing at stations 1 to 8 respectively of the machine.

Figs. 9 and 9A taken together constitute a diagrammatic front elevation of the machine.

Fig. 10 is a plan view of the assembly of the main supporting plates, frames and tables of the machine.

Fig. 11 is a plan view of mechanism supported by inclined tables 27 and 32 and shows the conveyors associated therewith.

Figures 50, 51, 52:
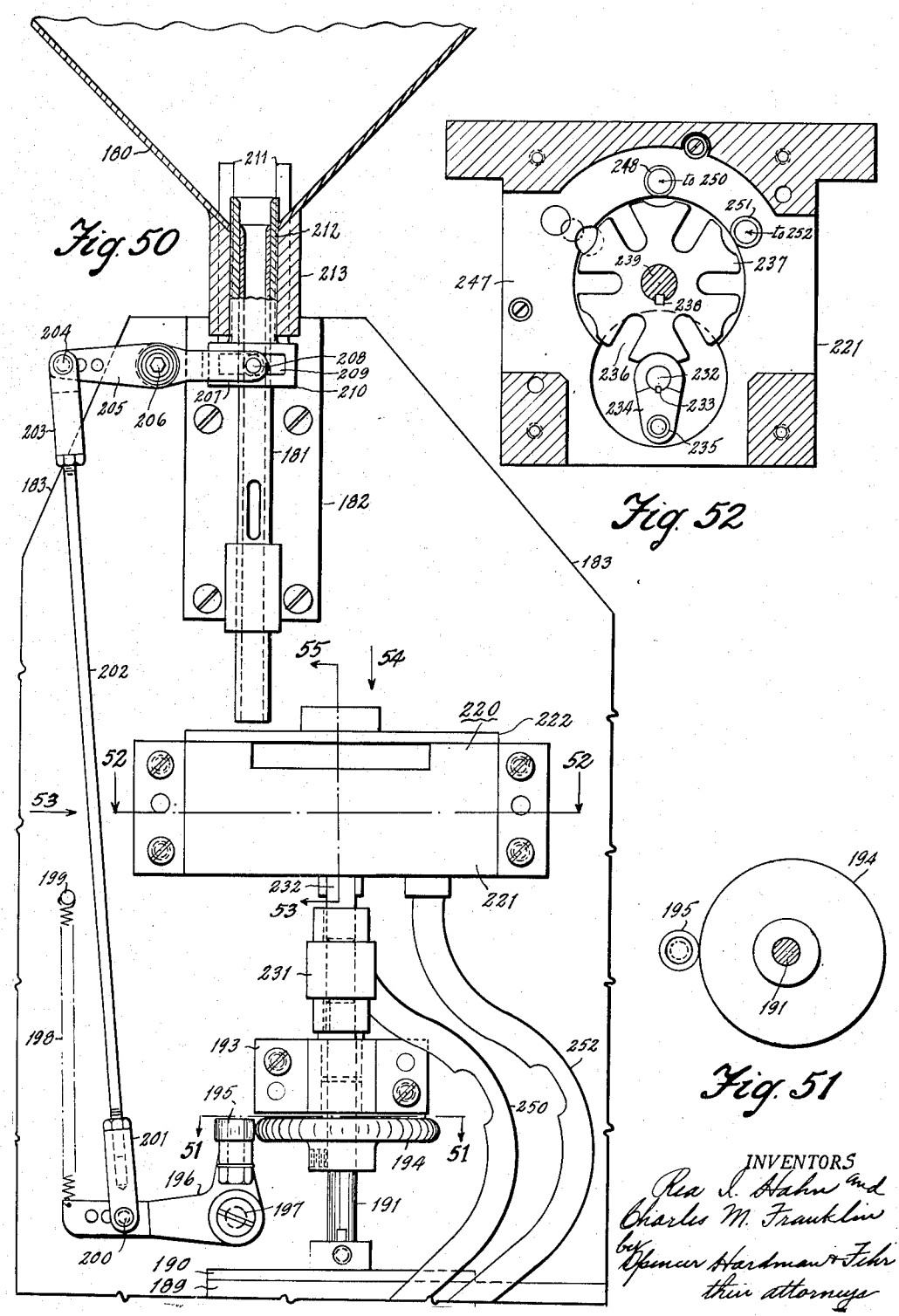

Figs. 12 and 12A together comprise a sectional view on line 12—12 of Fig. 9.

Figs. 13 and 13A together constitute a sectional view on line 13—13 of Fig. 9.

Fig. 14 is a sectional view on line 14—14 of Fig. 9.

Fig. 15 is a fragmentary plan view of a portion of Fig. 14 in the direction of arrow 15 thereof.

Fig. 16 is a view showing the conveyor which is included in Fig. 12.

Fig. 17 is a composite of longitudinal sectional views of a conveyor, the part indicated by bracket A being on line 17A—17A of Fig. 18, the part indicated by bracket B being on line 17B—17B of Fig. 18 and the part indicated by bracket C being on the line 17C—17C of Fig. 18.

Fig. 18 is a sectional view on line 18—18 of Fig. 17.

Fig. 19 is a view on line 19—19 of Fig. 11.

Fig. 20 is a sectional view on line 20—20 of Fig. 19.

Fig. 21 is a fragmentary view in the direction of arrow 21 of Fig. 20.

Fig. 22 is a sectional view on line 22—22 of Fig. 20.

Fig. 23 is a sectional view of a portion of Fig. 20 drawn to a larger scale.

Fig. 24 is a sectional view on line 24—24 of Fig. 22 and drawn to a still larger scale.

Fig. 25 is a fragmentary sectional view on line 25—25 of Fig. 19.

Fig. 26 is a sectional view on line 26—26 of Fig. 25.

Fig. 27 is a view in the direction of arrow 27 of Fig. 25.

Fig 28 is a sectional view on line 28—28 of Fig. 19.

Fig. 28A is a sectional view on line 28—28 of Fig. 19 showing a second nut feed station.

Fig. 29 is also a sectional view on line 25—25 of Fig. 19 with more parts shown in section.

Figs. 30, 31, 32 and 33 are sectional views taken respectively on lines 30—30, 31—31, 32—32 and 33—33 of Fig. 29. Fig. 30A is a sectional view on line 30A—30A of Fig. 30.

Fig. 34 is a sectional view on both lines 34—34 and both lines 34'—34' (right and left) of Fig. 11, with certain exceptions to be noted thereinafter. The lines 34—34 and 34'—34' (right) appear also in Fig. 19.

Fig. 34A shows in section, on an enlarged scale, the tools that are used at sections 34—34. Fig. 34A and Fig. 34B show in section the tools that are used at sections 34'—34'.

Fig. 35 is a side view of dies shown in section in Fig. 20 and is taken in the direction of arrow 35 of Fig. 19.

Fig. 36 is a view on line 36—36 of Fig. 35.

Fig. 37 is a view in the direction of arrow 37 of Fig. 35.

Fig. 38 is a sectional view on line 38—38 of Fig. 35.

Fig. 39 is a side view of the dies shown in Fig. 34, and is taken in the direction of arrow 38 of Fig. 19.

Fig. 40 is a view on line 40—40 of Fig. 39.

Fig. 41 is a view in the direction of the arrow 41 of Fig. 39.

Fig. 42 is a sectional view on line 42—42 of Fig. 39.

Fig. 43 is a fragmentary view similar to Fig. 19 with tube guide rails 341 and 343 added.

Fig. 44 is a fragmentary view in the direction of arrow 44 of Fig. 43.

Fig. 45 is a view on the line 45—45 of Fig. 43.

Fig. 46 is a view similar to Fig. 45 showing parts in other positions.

Fig. 47 is a fragmentary view showing certain parts shown in Fig. 43 in different positions.

Figs. 48 and 49 are sectional views taken respectively on lines 48—48 and 49—49 of Fig. 11.

Fig. 50 is a view of the upper right portion of Fig. 9 on an enlarged scale and shows the hopper feed and a nut sorting mechanism.

Fig. 51 is a sectional view on line 51—51 of Fig. 50.

Fig. 52 is a sectional view on lines 52—52 of Figs. 50 and 55.

Fig. 53 is a fragmentary view in the direction of arrow 53 of Fig. 50, but is drawn to a smaller scale, also in the direction of arrow 53 of Fig. 9.

Fig. 54 is a view in the direction of arrow 54 of Figs. 50 and 53.

Fig. 55 is a sectional view on line 55—55 of Figs. 50 and 54.

Fig. 56 is a sectional view on line 56—56 of Fig. 55.

Fig. 57 is a sectional view on line 57—57 of Fig. 56 showing a nut located flange-end up.

Fig. 58 is a sectional view on line 58—58 of Fig. 56 showing the nut flange-end down.

Fig. 59 is a fragmentary view in the direction of arrow 59 of Fig. 57.

Fig. 60 is a plan view of frame 100.

Fig. 61 is a view in the direction of arrow 61 of Fig. 60.

Fig. 62 is a view in the direction of arrow 62 of Fig. 60.

Figs. 63 and 63A constitute a view in the direction of arrow 63 of Fig. 60.

Fig. 64 is a view in the direction of arrow 64 of Fig. 63.

Fig. 65 is a sectional view on line 65—65 of Fig. 63.

Fig. 66 is an hydraulic diagram and

Figs. 67 and 68 are diagrams of certain valves thereof.

The functions of the machine will be described with respect to Figs. 1 to 8. In these figures, the tubes T are equally spaced. The tubes descend from a magazine to be described and are moved successively from station 1 to stations 2 to 8 and beyond to a position where the tubes descend to a hopper. The tubes are caused to move by conveyors which operate simultaneously. Fig. 1 shows the tube in a conveyor loading position at station 1. Fig. 2 shows the tube at station 2 where the first operation is performed. At station 2, the right end of the tube is shaped as shown in order to facilitate the assembling of nuts N and N'. Fig. 3 shows the tube in an intermediate feed position. Fig. 4 shows that at station 4 the nuts N and N' are assembled with the tube. Fig. 5 shows that the right end of the tube is engaged by a locating plunger 161 while the left end is given the first flaring operation. Fig. 6 shows that, at station 6, while the left end of the tube is engaged by a locating plunger 161', the right end is given the first flaring operation. Fig. 7 shows that, at station 7, the left end of the tube is given the final flaring operation. Fig. 8 shows that at station 8, the right end of the tube is given the final flaring operation.

In Fig. 9, which is a diagrammatic front elevation of the machine, the tools which perform the operations upon the tube and assemble the nuts are not shown. It will be understood that these tools are aligned respectively with the dot-dash lines numbered 1 to 8 which represent the eight stations explained in the preceding paragraph. As shown in Figs. 9 and 9A, the machine comprises a base 10 supporting transverse blocks 11 which support plate 12 which supports three I-beams 13 (see also Fig. 12) which support a plate 14. Plate 14 supports a plate 15 which can be adjusted horizontally to the right or left to the position shown in Fig. 9. Referring to Fig. 13, plate 15 is guided by rails 16 and 17 attached to plate 14. To the plate 15 there are attached threaded lugs or nuts 18 (Fig. 9) which are engaged by a screw shaft 19 journaled in brackets 20 and 21 which cooperate with the shaft 19 to prevent axial movement thereof. Shaft 19 is turned by a wheel 22 carrying a handle 23.

Plate 15 supports brackets 25 and 26 which support an inclined plate 27 and a horizontal plate 28. The portion of plate 28 which overhangs to the right of bracket 26 is supported by a bracket 29 attached to plate 15. The plate 27 supports the locating block L shown in Fig. 4, the locating plunger 161' shown in Fig. 6, and the tools to be described for performing the first and second left hand flares at stations 5 and 7. Near the right end thereof, the plate 14 supports brackets 30 and 31 which support an inclined plate 32 and a horizontal plate 33, the overhanging portion of which is supported by bracket 34 attached to plate 14. Plate 32 supports the tools which perform the operations shown in Figs. 2, 4, 6 and 8 and which supports the locating plunger 161, Fig. 5. In order to adapt the machine for operations upon tubing of different lengths, the spacing by the plates 27 and 32 is varied by moving the plate 15 by turning the wheel 22 (Fig. 9A).

Fig. 9 shows diagrammatically three conveyors Cr1, Cr2 and Cr3. Conveyor Cr1 is supported by plate 14, Cr2 is supported by plate 15. If the tubing is relatively short, conveyors Cr1 and Cr2 are only required. For longer tubing requiring greater spacing between plates 27 and 32, the conveyor Cr3 is located upon plate 14 intermediate the other conveyors. Conveyor Cr1 is shown in Figs. 12, 12A, 16, 17 and 18. Plate 14 supports a bracket 40 which supports a plate 41 forming one side of a magazine pocket, the other side of which is provided by a plate 42 joined to plate 41 by an end wall 43. The space between plates 41 and 42 receives tubes T which gravitate toward the conveyor. Plate 42 supports a bar 44 at its lower end, the upper end of the bar being attached to an angle 45 which is attached at one end to a bracket 46 supported by plate 33 and at its other end to a similar bracket 46 attached to plate 28. Bar 44 is parallel with and is spaced from a bar 47 attached at its upper end to a bracket 48 and at its lower end to bracket 40 having a grooved portion 49 which receives the bar 47. Referring to Fig. 18, screws 50 attach bars 51 and 52 to bar 47. Between the bars 47 and 51 there is located a sliding bar 53 having lugs 54 (Fig. 17). Bars 51 and 52 support the ends of pins 55, each of which provides a pivotal support for a pawl 56 urged clockwise (Fig. 17) by a spring 57, one arm of which bears against a recess surface 58 of bar 52 and the other end of which bears against the pawl 56 causing it to rotate until the end portion 59 thereof engages a stop surface 60 of bar 52. Bar 44 carries screws 61, each held in adjusted position by a nut 62. As shown in Fig. 17, each screw 61 is diametrically notched to receive the end of a coiled leaf-spring 63 which is biased downwardly into engagement with a tube T so as to normally press it against the upper surface 47a of the bar 47 (Fig. 18). Bar 44 is provided with notches 44a each for receiving a tube T when moved upwardly in a manner to be described.

Bar 53 is slidable in the space between the bars 47 and 51. It is reciprocated by a piston in a fluid pressure cylinder C1 (Fig. 12) and connected by rod 70 connected by pin 71 with a rod 72 connected with a lever 73 whose hub has a squared notch 74 to receive the squared portion of a shaft 75. A plate 76 attached to the hub of the lever 73 retains it in connection with the shaft 75. An arm 77 connected in similar manner with shaft 75 is connected by a link 78 with the bar 53. When bar 53 is retracted, that is, moved to the right, Fig. 17, the lugs 54 move between the position in full lines 54 and the dot-dash line position 54x. The tubes do not move back because they are engaged by the pawls 56 due to the action of springs 63. As the lug 54 moves from full line position 54 to the dot-dash line position 54x, the tubes are cammed upwardly into the notches 44a of plate 44 against the action of springs 63. After the lugs 54 are moved right past the tubes, the springs 63 return the tubes to positions at the left of the pawls 56. Movement of the bar 53, upwardly in Fig. 12 or to the left in Fig. 17, causes the tubes to be moved the distance between any of the stations 1 to 8. During such movement, the tube is guided by the facing parallel edges of plates 47 and 44. The numerals 1 to 8, placed on bar 47 in Fig. 12, indicate the stations also represented by Figs. 1 to 8. The tubes are moved also to stations 9 and 10 and then the tubes engage each other by the nuts assembled therewith and pile up as shown in the upper part of Fig. 12. Simultaneously the tubes move around the upper corner of bracket 48 and then gravitate down the back of bracket 48 as indicated at T1 (Fig. 12) and then down through a notch in plate 33 as indicated at T2 and then along the back of bracket 34 as indicated at T3 and thence from the machine into a suitable hopper or rack not shown. The conveyor Cr2 shown in Figs. 13 and 13A is constructed like conveyor Cr1 except the parts are arranged in reverse order. The parts of conveyor Cr2 similar to those of Cr1 are indicated by the same reference numbers with a prime affixed.

The plates 42 and 42' of conveyors Cr1 and Cr2, respectively, each support notched blocks 80 which receive the lower edge portions of angle bars 81 which extend between the plates 42 and 42' as shown in Fig. 10. Angle bars 81 appear in Fig. 15. Fig. 14 shows conveyor Cr3 which is constructed like the other conveyors and its corresponding parts bear the same reference numbers with a double prime affixed. Angle bars 81 support plate 42" spaced from plate 41" carried by bracket 40". The lower end of plate 42" supports the lower end of bar 44", the upper end of which is attached to angle bar 45. Bar 47" is received by notch 49" of bracket 40" and by a groove 82 provided by bracket 83 supported by plate 14. Brackets 83 and 40" support bar 47". Shaft 75 of Fig. 12 operates arm 77' in Fig. 13 and also the arm 77" in Fig. 14. Arm 73 (Fig. 12) is fixed axially with respect to shaft 75. Arms 77' and 77" are obviously adjustable along the shaft 75 into positions corresponding to the locations of the conveyors Cr2 and Cr3. The conveyors are in alignment and are operated simultaneously to move the tubing by engagement of its end portions and intermediate portion by bar lugs 54, 54' and 54" to move the tubes progressively into the stations 1 to 10 noted in Fig. 12. The tube magazine is provided by the aligned plates 41, 41', 41" spaced from aligned plates 42, 42', 42", respectively.

The apparatus for performing the first operation at station 2 (Fig. 2) will now be described with reference to Figs. 20 to 24. Plate 32 supports a frame 100 (see details in Figs. 60–65) which overhangs the left edge thereof and supports a block 90 supporting a cylinder C4, the piston of which is connected with rod 91 threaded into a rod 92 slidable in a bore 93 and supporting a block 94 which in turn supports a tube gripping jaw 95 cooperating with an upper jaw 96 supported by a block 97 attached to frame 100. When the piston of cylinder C4 moves upwardly, the jaws 95 and 96 close upon the tube T and prevent axial movement thereof due to the engagement of the outer surface of the tube by fine teeth 98 provided by screw threads formed in the blocks, while held together, and then blunted slightly according to the radii 99 (Fig. 24).

Frame 100 supports a tube locating plunger 101 having a blade provided with a V-notch 102 (Fig. 21), the plunger being urged upwardly by a spring 102a retained by a plug 103. The function of plunger 101 is to locate the tube end in the groove of jaw 95. The upper jaw 96 receives a stripper rod 105 urged downwardly by a spring 106 until a shoulder 107 of the rod engages the jaw 96. Spring 106 is retained in compression by a plug 108 through which the rod 105 extends, the upper end of rod 105 being bent to provide a handle 109 by which the rod can be lifted when required. While the tube T is gripped by jaws 95 and 96 at station 2, the right end of the tube is sized, that is, its right end is shaped by a die 110 and a rod 111 so that said end will be free of burrs in order that nuts N and N' (Fig. 4) can be passed readily over the tube. Rod 111 is secured to die 110 and the latter is secured to a slidable rod 112 guided by a bushing 113 in the frame 100 and connected by a coupling 114 with the rod 115 of a piston in cylinder C9. When the jaws 95 and 96 are closed, the rod 115 moves left to effect the sizing operation. The bevel shown on the tubing in Figs. 2, 3 and 4 may be somewhat exaggerated; but it indicates that the burr has been removed. Other views of parts 94, 95, 96, 97 are shown in Figs. 35 to 38.

The apparatus for flaring the ends of the tube will now be described with reference to Fig. 34. Frame 100 supports a block 120 which supports a cylinder C6 whose piston is attached to a rod 121 threadedly connected with a rod 122 attached to a block 123 carrying spaced lower jaws 124 and 125 cooperating with upper jaws 126 and 127 respectively carried by a block 128 attached to the frame 100 with a block 128a between. Other views of parts 123—128a are shown in Figs. 39-42. The jaws 124, 126, 125 and 127 have teeth provided by screw threads like the teeth 98 of the jaws 95, 96 (Fig. 23). The rod 122 carries a plunger 130 whose tube-locating blade 131 is received by the space between the jaws 124 and 125 and is provided with a V-notch like 102 (Fig. 21). The function of blade 131 is to locate the tube end in the grooves of jaws 124 and 125. Plunger 130 is urged upwardly by a spring 132. The space between the jaws 126 and 127 receives a stripper rod 135 made like the stripper rod 105 of Figs. 20 and 22. The jaws 125 and 127 are provided with cooperating die surfaces 125a, 125b and 127a, 127b, respectively so that the tube will be shaped as shown in Fig. 34A when engaged by the tool 140 which is received by the socket 141 in a rod 142 guided by a bushing 143 provided by the frame 100. Rod 143 is connected by coupling half members 144 and 145 (secured by a screw 146) with a rod 147 attached to the rod 148 of a piston in cylinder C8 attached with spacer block 149 to frame 100. While the jaws grip the tube T as shown in Fig. 34A, the piston of cylinder C8 moves the tool 140 left to perform the operation shown. Before this operation is performed and before the jaws engage the tube, by means to be described later, the tube is urged right by a locating plunger 161' (Fig. 6) against a stop provided by plunger 150, the upper edge of which would be approximately in line with the upper surface of jaw 125 when down. As the tool 140 advances toward the tube, a beveled edge 151 of rod 142 engages the beveled upper end of the plunger 150 to move it down against the action of a spring 152, thus moving the plunger 150 away from the tool 140 so that the operation can be performed without interference by the plunger 150. When the tool 140 separates from the tube, the plunger 150 moves up until a shoulder 154 thereof engages the jaw 125. The apparatus for performing the operation at station 8 as shown in Fig. 34B is similar to that shown in Fig. 34 with the exception that tool 160 is used in place of tool 140, and the stop plunger 150 is not provided since the tube is not urged right by the locating plunger 161'.

Apparatus similar to that which performs the first right hand flare and the second right hand flare at stations 6 and 8 (Figs. 6 and 8) is provided on the left side of the machine for performing the first left hand flare at station 5 (Fig. 5) and the second left hand flare at station 7 (Fig. 7). While performing the first left hand flare at station 5, the right end of the tube is engaged by the locating plunger 161 which urges the tube left against a stop plunger 150 provided by the left hand tube flaring apparatus like that shown in Fig. 34, but reversed. While the first right hand flare is made at station 6, the tube is urged right against the stop plunger 150 as mentioned before by a locating plunger 161', Fig. 6.

The apparatuses for operating plungers 161 and 161' will now be described with reference to Figs. 48 and 49. Referring to Fig. 48, the frame 100 supports a block 162 and a cylinder C3 whose piston is connected by a rod 163 with a cam block 164 guided by the frame 100 and engageable with the right inclined end of a rod 165 urged right by a spring 166. Rod 165 is attached to a sleeve 167 slidable in a bore 168 of the frame 100 and containing a spring 169 bearing against the plunger 161 which has a flange 170 engageable with the flange 171 of the sleeve 167 when the spring 169 is permitted to expand. Upward movement of the piston of cylinder C3 causes left movement of rod 165 to cause the plunger 161 to engage the right end of a tube which is guided through a groove 313 in plate 258, thus the tube is urged left by yielding pressure applied by spring 169 to the plunger 161. The mechanism for operating plunger 161' at station 6 is similar to that for operating plunger 161; and similar parts are indicated by the same reference numerals with the prime affixed except that the left cylinder is marked C3A. The parts are supported by a frame 100' which also supports the apparatus for performing the first and second left hand flares at stations 5 and 7 respectively which is like the apparatus for performing the operations at stations 6 and 8.

Cylinder C3 is shown at station 5 and cylinder C3A at station 6 in Fig. 11. Cylinders C6 and C8 of Fig. 34 are shown at station 6 in Fig. 11. At station 8 where the second right hand flare is performed there are cylinders C5 and C7 respectively like cylinders C6 and C8. At station 5 where the first left hand flare is performed, there are cylinders C6A and C8A. At station 7 where the second left hand flare is performed, there are cylinders C5A and C7A. Cylinders C4 and C9 of Fig. 20 are also indicated in Fig. 11.

The nuts N and N' to be assembled with the tube are received by a hopper 180, Figs. 50 and 53, and are caused to descend through a tube 181, carried by a bracket 182 which is attached to a frame 183 supported by plate 33 (Fig. 9). Frame 183 supports a plate 184 carrying a speed reducer 185 and an electric motor 186 which, through the reducer, drives a shaft 187 carrying a pulley 188 connected by a belt 189 with a pulley 190 which drives a shaft 191 supported by a bearing bracket 192 (Fig. 9) and by a bearing bracket 193 (Fig. 50) which are attached to frame 183. Shaft 191 drives an eccentric disc 194 for engaging a roller 195 carried by a bell crank lever 196 pivoted on a screw 197 supported by frame 183. Lever 196 is urged clockwise by a spring 198 attached to the lever and to a stud 199 carried by frame 183. Lever 196 is connected by a pin 200 with a clevis 201 connected by a rod 202 with a clevis 203 connected by a pin 204 with a lever 205 pivoted on a screw 206 supported by frame 183. Lever 205 provides forked arms 207 carrying studs 208 received by grooves 299 in a collar 210 supporting jiggle rods 211 and a tube 212 surrounding tube 181 and guided by a sleeve 213 attached to the lower end of the hopper 180. Reciprocation of the rods 211 causes the nuts to descend through the tubes 212 and 181.

The nuts descend from the tube 181 into a sorter 220 which as shown in Figs. 54-59, comprises a housing 221 attached to the frame 183 and supporting a cover 222. The nuts descend through a hole 223 in cover 222 and drop into holes 224 (Fig. 56) provided by a disc 225 keyed to a shaft 239 supported by a bearing 227 in a collar 228 attached to cover 222 and by a bearing 229 supported by the housing 221. Referring to Fig. 50, shaft 191 is connected by coupling 231 with a shaft 232 which as shown in Fig. 52 is connected by key 233 with a Geneva gear driving arm 234 carrying a roller 235 to be received by notches 236 in a Geneva gear driven disc 237 attached by a key 238 to the shaft 239 and to the disc 225. As shown in Figs. 55 and 56, disc 225 is provided with an annular groove 240 in which are located pawls 241, each pivotally supported on a rod 242 carried by the disc 225. Springs 243 urge the pawls 241 clockwise around their pivots so that the concave surfaces 244 of the pawls extend into the holes 224 which extend through the disc. When a hole 224 is aligned with a hole 223 in the cover, the pawl 241 associated with that hole is engaged by a roller 245 (pivoted on a screw 246) which cams that pawl 241 counterclockwise so that its surface 244 is away from the hole 224 so that a nut dropping through the hole 223 can pass into the hole 224 and bottom on the surface 247 (Fig. 57) of the housing 221. Therefore as the disc 225 rotates clockwise, it will push the nut along. If the nut descended with its hex-flange down (nut N'), the nut can gravitate from the hole 224 when said hole is aligned with a hole in the bushing 248 connected with a delivery pipe 250 (Figs. 52 and 58). If the nut descended flange up (nut N), it cannot pass out through the hole 224 when aligned with bushing 248 because the nut will be retained by the disc 225 due to the fact that the hex-flange of the nut rests on a pawl 241' as shown in Fig. 57. Therefore the nut with its hex-flange up will pass around to the position corresponding to hold position 224'' in alignment with a bushing 251 (Fig. 52) in housing 247 connected with a delivery pipe 252. When the nut N with flange up has arrived at hole position 224'', it can gravitate through said hole into bushing 251 and delivery pipe 252 because the pawl 241 then at 241'' is engaged by a roller 253 (Fig. 56) pivoted on a screw 254 attached to housing 221. In this way the nuts are sorted. The nuts N' with flanges down pass through pipe 250 and the nuts N with flanges up pass through pipe 252.

Frame 100 (Figs. 26, 28, 29) provides a recess 257 which is closed by a cover 258 and which receives a disc 260 supported by a disc 261 and connected therewith by balls 262 urged outwardly by a spring 263 in a cross bore 264 of disc 261 and into engagement with diametrically opposite ones of six notches 265 in the disc 260, thus providing a torque limiting driving engagement between the discs 261 and 260. Disc 261 is integral with a shaft 266 journaled in bearings 267 provided by housing 100 and cover 258. A key 268 attaches the shaft 266 to a Geneva gear driven disc 269 having notches 270 which receive roller 271 of a Geneva gear driving arm 272 attached to a shaft 273. Shaft 273 is rotatably supported by the frame 100 and by a cover 274 for a recess 275 in said frame. Shaft 273 is connected with a brake drum 277 engaged by a brake lining 278 supported by a band 279 (Fig. 27) which is clamped around the drum by a screw 280 passing through the ends of the band and threaded into the lug 281 provided by the cover 274. Thus rotation of the shaft 273 is resisted. Shaft 273 is rotated one revolution intermittently in one direction only by means which comprises a cylinder C2 (Fig. 19) whose piston is connected by a rod 285 which is connected with a rack 286 (Fig. 33) sliding in a bore 287 of frame 100 and engaging a gear 288 not directly connected with shaft 273 but supported thereby. Gear 288 (Figs. 25 and 29) provides a driving member 290 of a one-way clutch whose driven member 291 connected with shaft 273 is urged by spring 292 into engagement with the clutch member 290. Movement of the rack 286 up (Figs. 12 and 33) causes the gear 288 to rotate counterclockwise and likewise the shaft 273, thereby rotating the Geneva driven disc 269 clockwise and the disc 260 clockwise. When the rack 286 moves down the gear 288 rotates clockwise, the notch 290a of the clutch member 290 rides over the lug 291a of member 291 causing it to move right against the action of spring 292. The brake holds the shaft 273 so that it cannot turn by the friction of the notch 290a riding on the lug 291a. Thus the shaft 273 is turned intermittently one revolution counterclockwise in Fig. 32.

Referring to Fig. 28, nuts N which gravitate threads down through pipe 252, are pushed by the weight of the nuts in pipe 252 through a hole 300 in frame 100, a hole 301 in a plate 302, and into one of six holes 303 in the disc 260. Only one nut N can enter hole 303 since its left movement is blocked by a plate 304 extending from a disc 304a (attached to frame 100, Fig. 28) and received by circumferential groove 305 in disc 260. The head of nut N extends initially a short distance to the right of the right face of disc 260. After the disc 260 receives one nut N as shown in Fig. 28, it is indexed 60° away from plate 304 to hole 311 in plate 302 which is in alignment with hole 310, in frame 100, which is in alignment with the lower end of pipe 250 through which nuts N' gravitate hex-flange down as shown in Fig. 28A. In Fig. 30A, this indexing movement of disc 260 is indicated by the arrow 260a. The head of nut N rides along the surface 302a and the nut is cammed thereby completely into the hole 303 of disc 260. The weight of nuts N' in tube 250 causes nut N to be pushed by a nut N' into the position shown in Fig. 28A.

The disc 260 carries the nuts N and N' to a hole 312 of cover 258 aligned with a groove 313 through which the right ends of tubes T pass. Hole 312 is aligned with hole 314 of plate 302 aligned with a sleeve 315 which receives a tube 316 attached by coupling 317 to the piston rod 318 of a piston in cylinder C10. Tube 316 encloses a spring 319 for urging left a plunger 320 having a shoulder 320a and a pointed end 321. When rod 318 moves left (Fig. 28), end 321 enters the tube T then aligned with hole 312 at station 4, the spring 319 urging the shoulder 320a against the right end of tube T. Tube 316 pushes the nuts N and N' over tube T. As these nuts move left from the position shown in Fig. 45 to that shown in Fig. 46, they push against fingers 325 and 326 and cause them to swing out as shown in Fig. 46 until the nuts pass to the left thereof, whereupon the fingers return to the positions shown in Fig. 45. This action insures that the nuts will be far enough to the left so as not to interfere with subsequent movement of the tube T laterally to the left in Fig. 43 as it moves between bars 341 and 343 which are spaced to permit the tube T to pass between them but so as to obstruct movement of the nuts inwardly to the mechanism for performing operations on the right end of the tube. Bar 341 is supported on brackets 342 attached to frame 100. Bar 343 is supported on brackets 344 and 345 attached to frame 100. Notches 346 of bar 343 receive the tube during operations performed at stations 6 and 8.

Finger 325 is pivotally supported by a pin 327 on a bracket 328 attached to plate 258 and is urged counterclockwise (Fig. 46) by a spring 329. Finger 326 is pivotally supported by a pin 330 on a bracket 331 and urged clockwise by a spring 332. When a tube T is being pushed by the conveyors as indicated at T1 and T2 (Fig. 43), the finger 326 is in the position shown in Fig. 47 to receive the tube at T3 at the end of conveyor movement. Before the nuts are pushed onto the tube, the finger 326 is lifted to the position shown in Fig. 43 to locate the tube end at T4. The lowering and raising of the finger 326 is effected by the movement of block 94 (Figs. 19 and 20) which is attached by a bar 333 which supports the bracket 331.

The cycle of operations will now be described with reference to Fig. 66. P1 and P2 are motor operated pumps for supplying oil at suitable flow rate and pressure. Valve MRV is a metering and pressure relief valve with return to the oil tank (not shown).

The cycle starts with the four-way valve 4V1 set to pass oil through pipe 422 to sequence valve S1. The oil passes through sequence valve S1 causing the piston of cylinder C3 to move left, the piston of cylinder C3A to move right and the piston of cylinder C4 to move up. The right end of the tube at station 5 (Fig. 1) is engaged by locating plunger 161. The left end of the tube at station 6 is engaged by locating plunger 161'. The tube at station 2 is gripped between jaws 95 and 96 (Fig. 21). The right end of the tube at station 4 is at T4 (Fig. 43).

After said pistons have completed the movements recited in the preceding paragraph, pressure builds up which causes sequence valve S1 to pass oil to valve S2 and thence to the cylinders C5, C5A, C6, C6A, and C9 to cause pistons of cylinders C5, C5A, C6 and C6A to move up and the piston of cylinder C9 to move left. The right end portions of the tubes at stations 6 and 8 are gripped by jaws 124, 126 and 125, 127, and the left end portions of the tubes at stations 5 and 7 are gripped by similar jaws and the right end of the tube at station 2 is sized by the dies 110, 111 shown in Fig. 23.

After the pistons mentioned in the preceding paragraph have completed their movements, pressure builds up to cause sequence valve S2 to pass oil to valve S3 and thence to cylinder C1 to cause the piston of cylinder C1 to move left (Fig. 12) to retract conveyor bar 53 preparatory to the next operation and to cause the piston of cylinder C2 to move down preparatory to the next operation of indexing the disc 260 (Fig. 30).

After the pistons mentioned in the preceding paragraph have completed their movements, pressure builds up to cause sequence valve C3 to pass oil to sequence valve C4 and thence to cylinders C7, C7A, C8, C8A and C10 to cause the pistons of cylinders C7 and C8 to move left and the pistons of cylinders C7A and C8A to move right to perform flaring operations at stations 5, 6, 7 and 8, and to cause the piston of cylinder C10 to move left to assemble the nuts on the tube at station 4.

After the pistons mentioned in the preceding paragraph have completed their movements, pressure builds up in sequence valve S4 to cause it to pass oil to valve 4V2 to cause it to reverse and thereby to cause reversal of four-way valve 4V1 which causes valves S5, S6 and S7 to operate in sequence. Valve S5 first passes oil to cause reverse or retractive movements of the pistons of cylinders C7, C7A, C8, C8A, C9, C3, C3A and C10. These movements are followed by operation of valve S5 to pass oil through valve S6 to cause retractive movements of the pistons of cylinders C5, C5A, C6, C6A and C4. The tube ends are released from gripping jaws and the tubes are ready to be moved by the conveyors. The movements last mentioned are followed by operation of valve S6 to pass oil through valve S7 to cause a movement of the piston of cylinder C1 which causes indexing of the tubes by the conveyors, and to cause a movement of the piston of cylinder C2 which causes indexing of the disc 260 which brings nuts N and N' into position at station 4.

After the pistons of cylinders C1 and C2 have completed their last mentioned movements, pressure builds up in valve S7 to cause it to pass oil to valve 4V2 to reverse it; and the reversal of valve 4V2 causes reversal of valve 4V1 and the cycle is repeated.

The machine stops by stopping the pumps or by manipulating a shut-off valve SV to disconnect the pumps from the valve MRV and to connect the pumps with drain.

Figs. 67 and 68 show diagrams of valves 4V2 and 4V1 respectively and Fig. 67 shows a diagram of valve S4 which is like the other sequence valves. Pipe 400 connects valve S3 with valve S4. Pipe 401 leads from valve S4 to cylinders C10, C7, C8, C7A and C8A. When the pistons of these cylinders have completed their movements toward the work, pressure in cylinder 402 of valve S4 builds up and overcomes spring 403 and valve plunger 404 of valve S4 rises so that pipe 400 becomes connected with pipe 405 and the valve plunger 410 of valve 4V2 moves right to connect pressure pipe 411 with pipe 412 and to block pipe 411 from pipe 413 and to connect pipe 413 with tank and to disconnect pipe 412 from tank. Pipe 412 conducts pressure to the right of the valve plunger 420 of valve 4V1 to cause it to move left to connect pressure pipe 411 with pipe 421 leading to valve S5 and to disconnect pipe 411 from pipe 422 leading to valve S1 and to connect pipe 422 with tank and to disconnect pipe 421 from tank. Valves S5, S6 and S7 operate in sequence and then valve 4V2 is returned to the status shown in Fig. 67 and consequently valve 4V1 returns to the status shown in Fig. 68 and valves S1, S2, S3 and S4 operate in sequence. When valve S4 is tripped, valves 4V2 and 4V1 reverse again as stated at the beginning of this paragraph.

While the embodiment of the present invention as herein disclosed, constitutes a preferred form, it is to be understood that other forms might be adopted, all coming within the scope of the claims which follow.

What is claimed is as follows:

1. In apparatus for assembling coupling nuts with tubing, mechanism for segregating and feeding nuts having in combination a hopper feed having a hopper for receiving nuts, each having a wrench-flange at one end thereof, a discharge tube through which the nuts gravitate from the bottom of the hopper and means for dislodging the nuts to cause them to enter the tube, a nut-segregating device for receiving nuts from the discharge tube of the hopper feed and comprising a fixed horizontal plate with two discharge holes therein, delivery pipes connected respectively with said holes, a rotatable plate having holes, each for receiving a nut dropping from the discharge tube upon the fixed plate, means for rotating the plate, members carried by the rotatable plate and each normally positioned so as to extend into a hole in the rotatable plate and to retain in the hole a nut which descends wrench-flange end up by engaging the underside of the wrench-flange, the nut which descended wrench-flange end down into a hole in the rotatable plate being free to gravitate through the first hole in the fixed plate at which said last mentioned nut arrives during its travel with the rotatable plate, and means for retracting each retaining member by the time that a nut with its wrench-flange-end up arrives at the second hole whereby it is free to gravitate through the second hole.

2. In apparatus for assembling coupling nuts with tubing, the combination comprising delivery pipes through one of which nuts gravitate wrench-flange-end up and through the other of which nuts gravitate wrench-flange-end down, a fixed plate having holes connected respectively with the pipes and through which the nuts pass, a rotary plate adjacent the fixed plate and having holes for receiving the nuts, means for intermittently moving the rotary plate so as to bring its holes successively into alignment with that hole of the fixed plate through which there pass the nuts which had gravitated with their wrench-flanges up and then into alignment with the other hole of the fixed plate and then to a station where the two nuts carried in each hole in the rotary plate are to be assembled with a piece of tubing, means at said station for assembling with the piece of tubing the nuts within a hole of the rotary plate, and means for preventing the reception of more than one nut which has descended wrench-flange up by a hole of the rotary plate when located in alignment with the first specified hole in the fixed plate.

3. In apparatus for assembling coupling nuts with tubing, the combination comprising a hopper feed for the nuts, means for segregating the nuts which descend from the hopper feed wrench-flange down from the nuts which descend wrench-flange up, two delivery tubes respectively for receiving the segregated nuts, means for receiving nuts from the delivery tubes and for grouping them in pairs with their wrench-flange-ends adjacent and means for assembling the paired nuts with pieces of tubing.

4. The combination defined in claim 3 having power means for continuously operating the hopper-feed and the nut segregating means whereby the delivery tubes are supplied with nuts and having means for feeding the pieces of tubing successively to the station where the nuts are assembled therewith and means for causing operation of the nut-grouping means and the tubing-feeding means concurrently and then the operation of the means which assembles a pair of nuts with a piece of tubing.

5. In an apparatus for sorting workpieces which have dissimilar ends but which are identical with each other; means for feeding the workpieces axially into sorting stations; means in said sorting stations for distributing the workpieces depending on whether one end or the other is lowermost; and means for assembling the sorted workpieces in paired coaxial arrangement with similar ends thereof together.

6. In an apparatus for sorting workpieces which have dissimilar ends but which are identical with each other; a sorting station adapted for receiving the workpieces in the axial direction; a pair of receiving stations for receiving the workpieces delivered to said sorting station; means of selectively distributing the workpieces from said sorting station to the said receiving stations in accordance with whether the one end or the other thereof is lowermost; and means adapted for receiving the sorted workpieces from said receiving stations and for combining them in pairs with the similar ends in abutting relationship.

REA I. HAHN.
CHARLES M. FRANKLIN.

References Cited in the file of this patent

UNITED STATES PATENTS

| Number | Name | Date |
|---|---|---|
| 1,302,280 | Batchelder | Apr. 29, 1919 |
| 1,341,278 | Morey | May 25, 1920 |
| 1,411,169 | Ehrman | Mar. 28, 1922 |
| 1,571,157 | McCall | Jan. 26, 1926 |
| 1,765,825 | Cork | June 24, 1930 |
| 1,783,639 | Canny et al. | Dec. 2, 1930 |
| 1,856,768 | Johnson et al. | May 3, 1932 |
| 1,918,557 | Pfeiffer | July 18, 1933 |
| 2,027,406 | Spatta | Jan. 14, 1936 |
| 2,117,543 | Corrigan | May 17, 1938 |
| 2,176,188 | Pool et al. | Oct. 17, 1939 |
| 2,278,599 | Veit | Apr. 7, 1942 |
| 2,326,982 | Summers et al. | Aug. 17, 1943 |
| 2,333,940 | Kuehlman | Nov. 9, 1943 |
| 2,464,510 | Hull | Mar. 15, 1949 |